United States Patent [19]

Stewart

[11] Patent Number: 5,322,629

[45] Date of Patent: Jun. 21, 1994

[54] METHOD AND APPARATUS FOR TREATING STORM WATER

[75] Inventor: William C. Stewart, Gladstone, Oreg.

[73] Assignee: W & H Pacific Inc., Bellevue, Wash.

[21] Appl. No.: 25,020

[22] Filed: Mar. 2, 1993

[51] Int. Cl.[5] ............................................. B01D 37/00
[52] U.S. Cl. .................................. 210/767; 210/170; 210/263; 210/289; 210/291; 210/455; 210/456
[58] Field of Search ............... 210/767, 688, 264, 912, 210/289, 170, 291, 532.2, 615, 617, 263, 455, 456

[56] References Cited

U.S. PATENT DOCUMENTS

| | | | |
|---|---|---|---|
| 968,983 | 8/1910 | Riedy | 210/291 |
| 3,674,687 | 7/1972 | Quase | 210/170 |
| 4,959,084 | 9/1990 | Wolverton et al. | 210/615 |
| 4,976,873 | 12/1990 | Ross | 210/264 |
| 5,084,163 | 1/1992 | Baumann et al. | 210/291 |
| 5,232,587 | 8/1993 | Hegemier et al. | 210/170 |

OTHER PUBLICATIONS

Bohn, H. L., "Soil and Compost Filters of Malodorant Gases," APCA Note-Book 25(9):953-955, 1975.

Bohn, H. L., "Compost Scrubbers of Malodorous Air Streams," Compost Sci. (Winter):15-17, 1976.

Rands, M. B., "Compost filters for $H_2S$ removal from anaerobic digestion and rendering exhausts," Journal WPCF 53(2):185-189, 1981.

Pomeroy, R. D., "Biological treatment of odorous air," Journal WPCF 54(12):1541-1545, 1982.

Leson, G. et al., "Biofiltration: An Innovative Air Pollution Control Technologyb for VOC Emissions," J. Air Waste manage. Assoc. 41(8):1045-1054, 1991.

Kirkham, M. B., "Organic Matter and Heavy Metal Uptake," Compost Sci. (Jan.-Feb.):18-21, 1977.

Sposito, G., "Sorption of Trace Metals by Humic Materials in Soils and Natural Waters," CRC Critical Reviews in Environmental Control 16:193-229, 1986.

Chiou, C. T., "Theoretical Considerations of the Partition Uptake of Nonionic Organic Compounds by Soil Organic Matter," Soil Science Society of America and American Society of Agronomy, Madison, Wis., SSSA Special Publication 22:1-29, 1989.

Pignatello, J. J., "Sorption Dynamics of Organic Compounds in Soils and Sediments," Soil Science Society of America and American Society of Agronomy, Madison, Wis, SSSA Special Publication 22:45-80, 1989.

Senesi, N. et al., "Interactions of Toxic Organic Chemicals with Humic Substances," in Toxic Organic Chemicals in Porous Media, Z. Gerstl et al. (eds.), Springer-Verlag, New York, N.Y., 38-90, 1989.

DeBoodt, M. F., "Application of the Sorption Theory
(List continued on next page.)

Primary Examiner—Robert A. Dawson
Assistant Examiner—Ana M. Fortuna
Attorney, Agent, or Firm—Christensen, O'Connor, Johnson & Kindness

[57] ABSTRACT

Storm water runoff is treated by passing the runoff through a bed of high quality leaf compost material to remove pollutants from the runoff prior to discharge into a water receiving system, such as a river, lake or storm water drainage system. Apparatus for treating storm water runoff is disclosed having at least one chamber for containing compost defined by a pair of opposed side walls and a pair of opposed end walls; an influent pathway for providing storm water to the compost chamber, a drain field positioned beneath the compost chamber for receiving storm water from the compost chamber, a layer of water permeable material interposed between the compost chamber and the drain field providing fluid communication between the compost chamber and the drain field while preventing the flow of compost material into the drain field, and a storm water outlet in fluid communication with the drain field for discharging treated storm water from the apparatus.

9 Claims, 5 Drawing Sheets

OTHER PUBLICATIONS to Eliminate Heavy Metals From Waste Waters and contaminated Soils," in *Interactions at the Soil Colloid-Soil Solution Interface*, G. H. Bolt et al., (eds.), Kluwer Academic Publishers, Boston, Mass., 293-299, 1991.

Bell, J. P. et al., "Removal of hazardous organic pollutants by biomass adsorption," *Journal WPCF* 59:191-198, 1987.

Bell, J. P. et al., "Removal of Hazardous Organic Pollutants by Adsorption on Microbial Microbial Biomass," *Wat. Sci Tech.* 19:409-416, 1987.

Tsezos, M. et al., "Significance of Biosorption for the Hazardous Organics Removal Efficiency of a Biological Reactor," *Wat. Res.* 22:391-394, 1988.

Tsezos, M. et al., "Comparison of the Biosorption and Desorption of Hazardous Organic Pollutants by Live and Dead Biomass," *Wat. Res.* 23:561-568, 1989.

Final Report, "Compost Storm Water Treatment System," W&H Pacific, Portland, Oreg., Mar. 2, 1992.

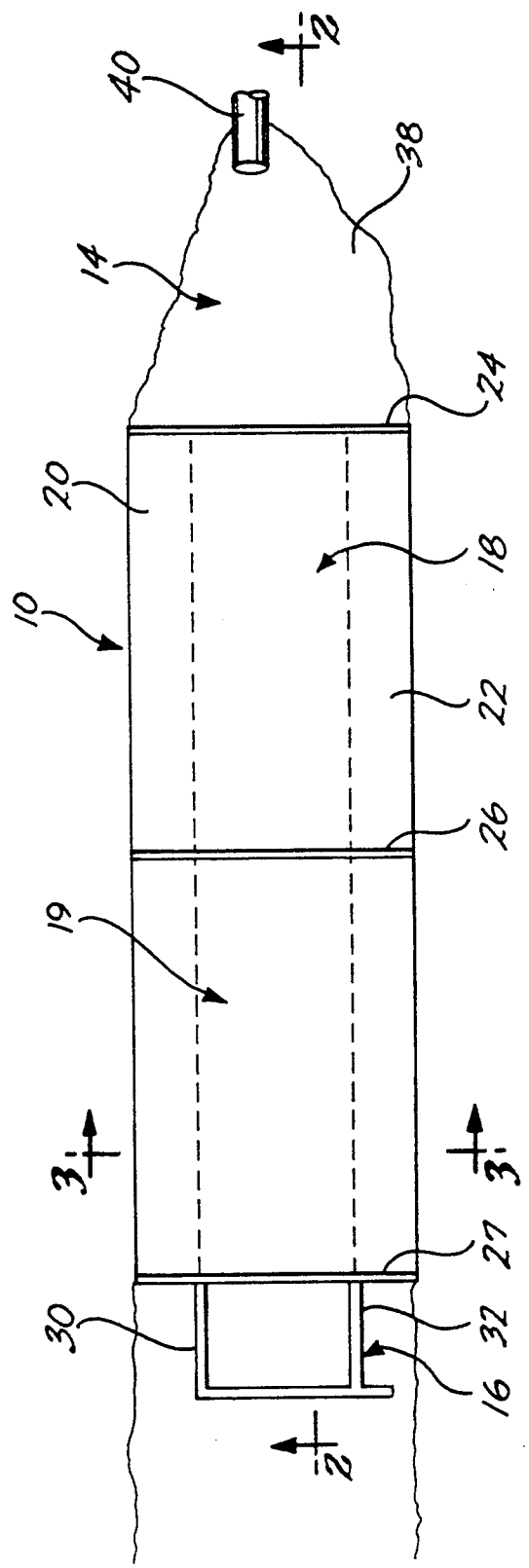

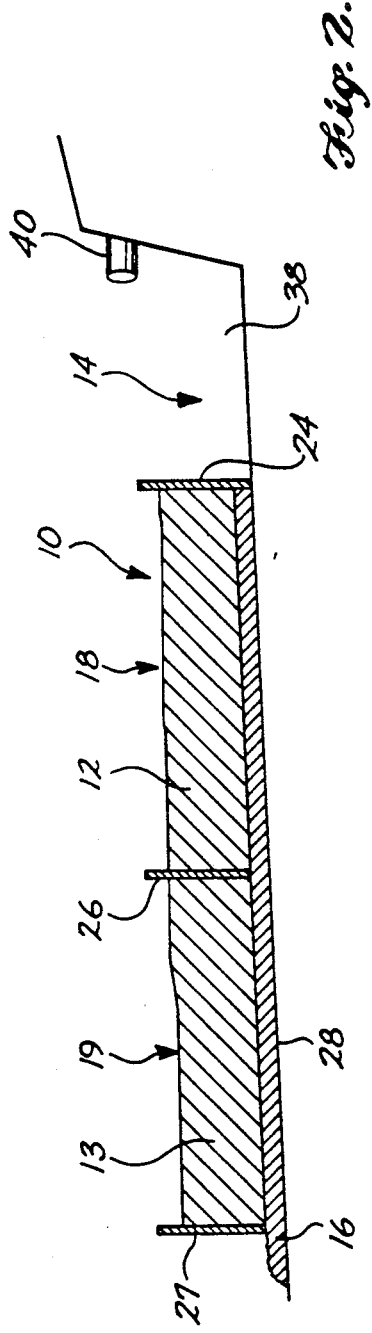
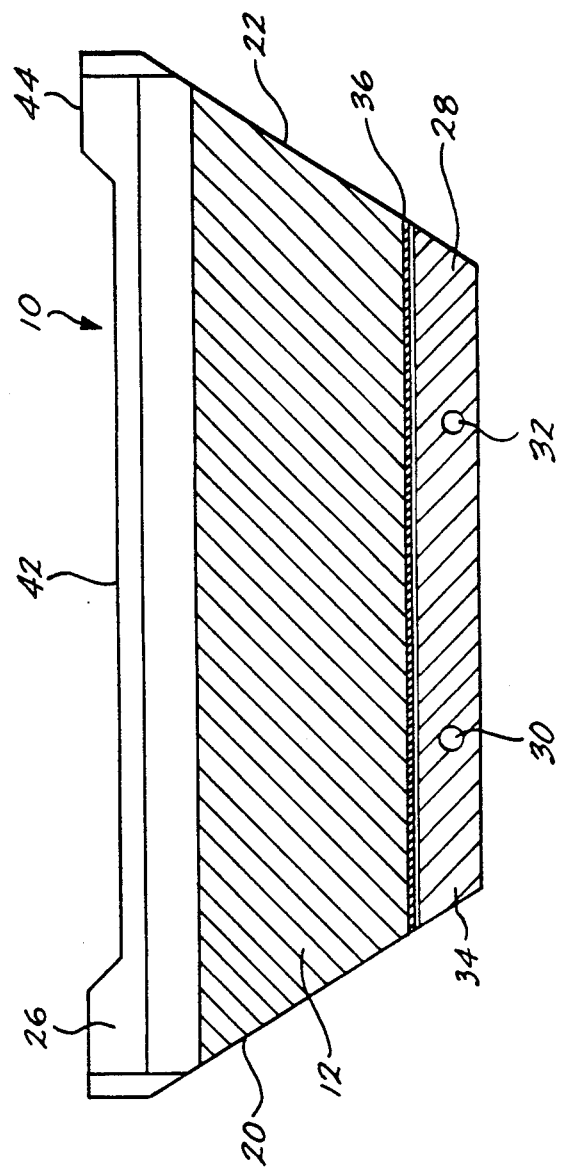

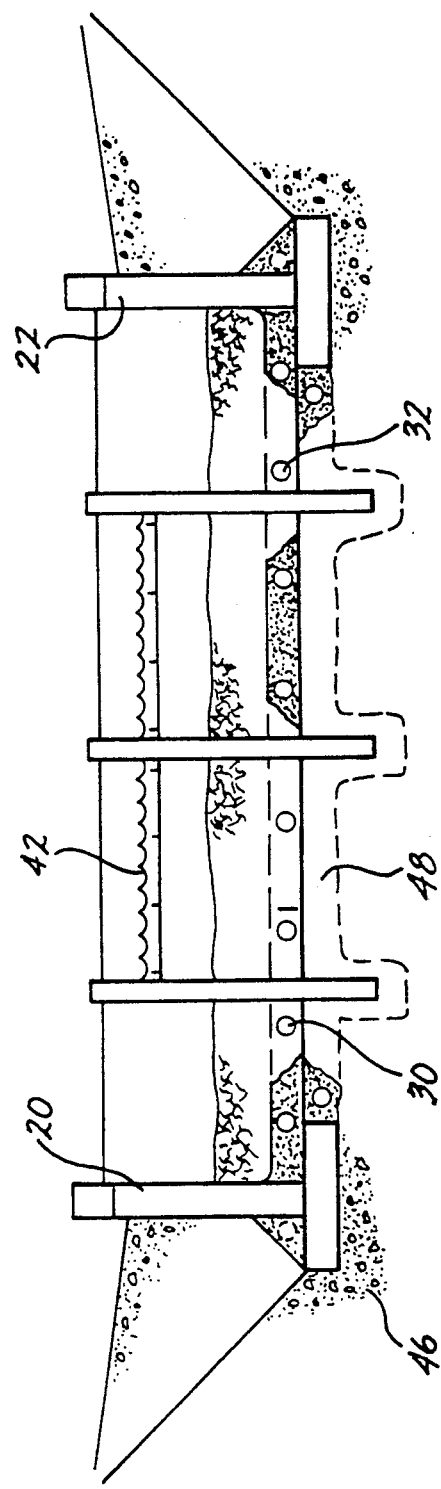

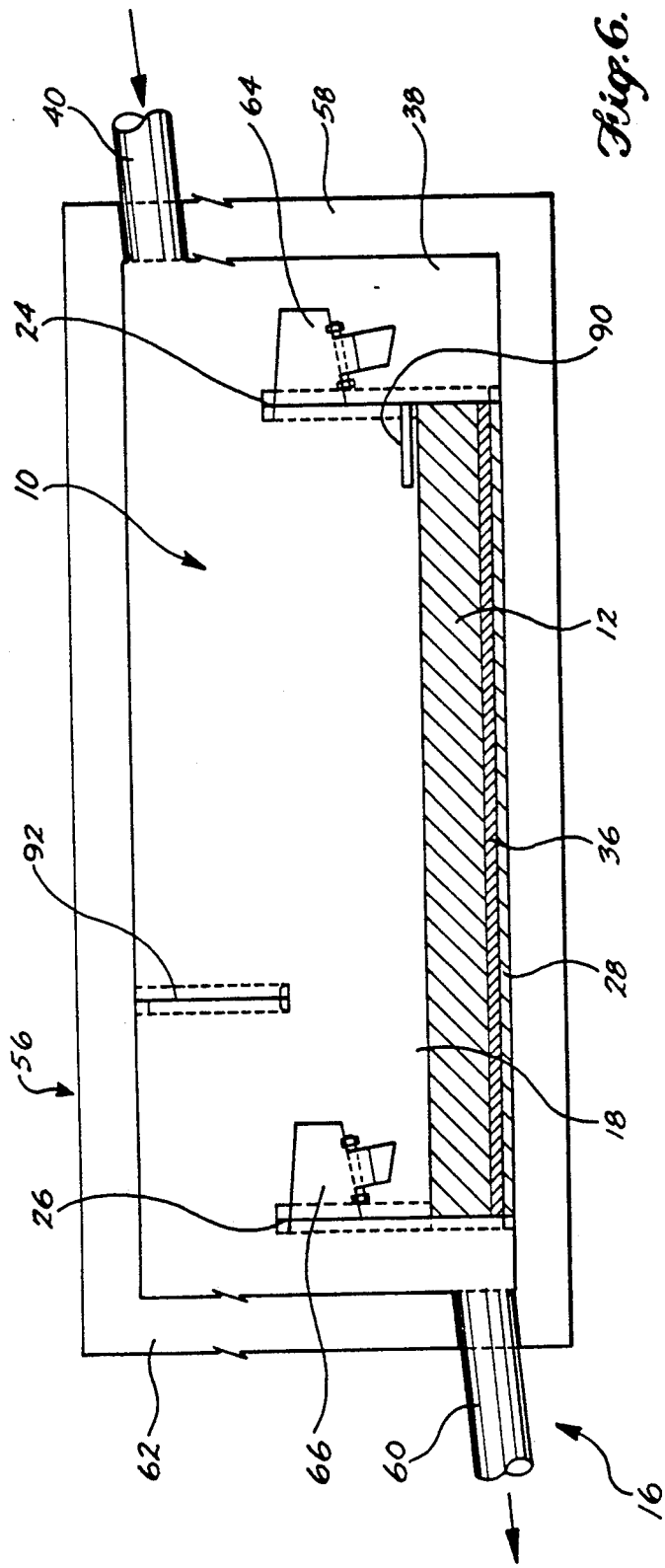
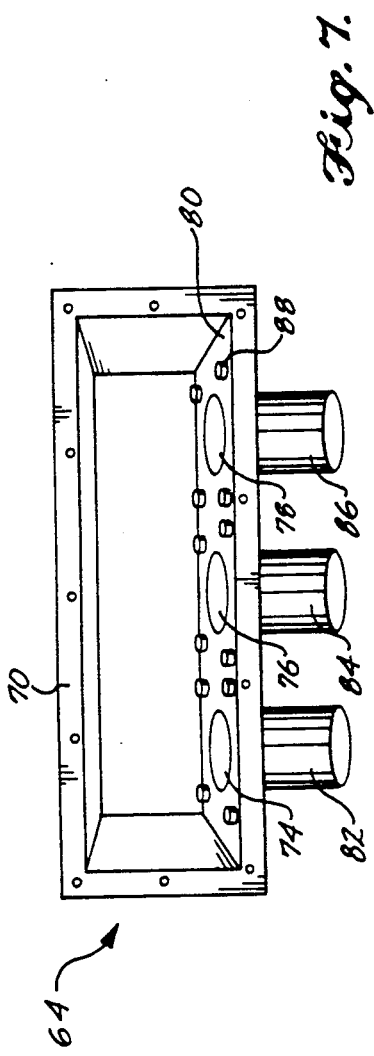

METHOD AND APPARATUS FOR TREATING STORM WATER

FIELD OF THE INVENTION

The present invention relates to methods and apparatus for treating storm water runoff. More particularly, the present invention relates to the treatment of storm water runoff by passing the runoff through a bed of deciduous leaf compost to remove impurities in the runoff.

BACKGROUND OF THE INVENTION

Storm water runoff is considered a form of diffuse or non-point pollution. It is caused by rain flushing pollutants such as particulate matter, nutrients, heavy metals and organic toxins (oil and grease, pesticides, herbicides) into natural bodies of water. Pollution from storm water runoff is aggravated by such activities as land clearing and urbanization, in the latter case due to paving which renders land impermeable to water, acts as a non-adsorbent collection surface for contaminants, and increases runoff rates and volumes.

Several hundred years ago, storm water runoff was not a problem. Rain fell on earth rich in organic matter formed by the accumulation of decayed vegetation. This organic matter absorbed and filtered the water before it made its way into the groundwater, streams and rivers. In addition, the undisturbed soils lost little particulate matter due to erosion, and there was insignificant, if any, amounts of oil and grease, heavy metals or organic toxins to be carried into the receiving wetlands, streams and rivers.

Recognition of the deleterious effects which present-day urban activities and urban storm water runoff have on natural bodies of water and their flora and fauna, has resulted in new regulations for storm water treatment (Novotny, V, "Diffuse (Nonpoint) Pollution—a Political, Institutional, and Fiscal Problem," *Journal WPCF* 60(8):1404–1413, Ed. 1988a; Novotny V., "Nonpoint Pollution: 1988—Policy, Economy, Management, and Appropriate Technology," American Resources Association, Bethesda, MD, Ed. 1988c; Novotny, V., "Nonpoint Pollution: 1988—Policy, Economy, Management, and Appropriate Technology," American Resources Association, Bethesda, MD Ed. 1988b; Novotny V. et al., "Linking Nonpoint Pollution and Deterioration," *Water Environ. & Tech.* 1:400–407, 1989; EPA, National Pollutant Discharge Elimination System Permit Application Regulations for Storm Water Discharges; Final Rule, U.S. Environmental Protection Agency, Federal Register 40 C.F.R. Parts 122, 123, and 124, 1990; EPA, Draft Fiscal Year 1989 Nonpoint Source Report to Congress, U.S. Environmental Protection Agency, 1990a; Field, R. et al., "Urban Storm-Induced Discharge Impacts," *Water Environ. & Tech.* (August):-64–67, 1990; Novotny, V., "Urban Diffuse Pollution; Sources and Abatement," *Water Environ. & Tech.* 3:60–65, 1991; Tarbert, R.E., "The Downpour of Stormwater," *Regs. Environ. Prot.* (June):27–46, 1991). These regulations require treatment of storm water runoff from urban roadways, industrial sites, parking lots and other facilities where pollution problems due to runoff can occur.

Conventional approaches for treating storm water runoff include wet detention ponds, constructed wetlands, grassy swales (vegetative control) and infiltration basins (Federal Highway Administration, "Retention, Detention, and Overload Flow for Pollutant Removal from Highway Stormwater Runoff," *FHWA/RD*-87-056, 1988; Horner R.R., "Biofiltration Systems for Storm Runoff Water Quality Control," *Washington State Dept. of Ecology*, 1988; Roesner, L.A. et al., "Design of Urban Runoff Quality Controls," *American Society of Civil Engineers*, 1988; King County Department of Public Works, Surface Water Design Manual, King County, WA 1990). Land treatment of wastewaters is widely practiced and, properly designed and operated, can be a highly effective, efficient and environmentally safe method of water pollution control (EPA, Process Design Manual for Land Treatment of Municipal Wastewater, U.S. Environmental Protection Agency, EPA-625/1-77-008, 1977; EPA, Design Manual:Onsite Wastewater Treatment and Disposal Systems, U.S. Environmental Protection Agency, EPA-625/1-80-012, 1980; EPA, Process Design Manual—Land Treatment of Municipal Wastewater, Supplement on Rapid Infiltration and Overland Flow, U.S. Environmental Protection Agency, EPA-625/1-81-013a, 1984b; EPA, Handbook:Septage Treatment and Disposal, U.S. Environmental Protection Agency, EPA-625/6-84-009, 1984a; EPA, Process Design Manual for the Land Application of Municipal Sludge, Environmental Protection Agency, EPA-625/1-83-016, 1985; Kilduff J. E., "Design and Construction of Leaching Systems in Fill Based on Permeability," *Journal Environ. Eng.* Proceedings of the American Society of Civil Engineers, 115:239, 1989). In addition to nutrient control (Swift, R. S. et al., "Micronutrient Adsorption by Soils and Soil Colloids," In G. H. Bolt et al., Ed. Interactions at the Soil Colloid-Soil Solution Interface, Kluwer Academic Publishers, Boston, 257–292, 1991), land treatment systems are also capable of adsorbing heavy metals (Kirkham, M. B., "Organic Matter and Heavy Metal Uptake," *Compost Science* Jan.–Feb.: 18–21, 1977; Hutchins et. al., "Fate of Trace Organics During Land Application of Municipal Wastewater," *CRC Critical Reviews in Environmental Control* 15(4): 355, 1985; Kotuby-Amacher J., et al., "Factors Affecting Trade Metal Mobility in Subsurface Soils," U.S. Environmental Protection Agency, EPA-600/S2-88/036, 1988; Zirschky, J. et. al., "Metals Removal in Overland Flow," *Journal WPCF* 61:470–475, 1989; Westall, J. C. et. al., "Adsorption of Organic Cations to Soils and Subsurface Materials," U.S. Environmental Protection Agency, EPA-600/S2-90/004, 1990; De Boodt, M. F., "Application of the Sorption Theory to Eliminate Heavy Metals From Waste Waters and Contaminated Soils," In G. H. Bolt et al., Ed. Interactions at the Soil Colloid-Soil Solution Interface, Kluwer Academic Publishers, Boston, 1991; Forstner, U., "Soil Pollution Phenomena—Mobility of Heavy Metals in Contaminated Soil," In G. H. Bolt et al., Ed. Interactions at the Soil Colloid-Soil Solution Interface, Kluwer Academic Publishers, Boston, 1991) and toxic organics (Sheng-Fu, C. et. al., "Aqueous Chemistry and Adsorption of Hexachlorocyclopentadiene by Earth Materials," In D. W. Shultz, Ed. Land Disposal: Hazardous Waste, U.S. Environmental Protection Agency, Cincinnati, Ohio, 29–42, 1981; Fuller, W. H. et al., "Soils in Waste Treatment and Utilization," Vol. I, Land Treatment CRC Press, Inc., Boca Raton, Fla., 1985; Scheunert, I. et al., "Predicting the Movement of Chemicals Between Environmental Compartments (air-water-soil-biota)," In P. Sheehan et al., Ed. Appraisal of Tests to Predict the Environmental Behavior of Chemicals, John Wiley & Sons, Inc., New York, N.Y., 285-332, 1985; Sims, R. C. et. al., "Treatment Potential for 56 EPA Listed Hazardous Chemicals in Soil," U.S. Environmental Protection Agency, EPA-600/S6-88/001, 1988; Chiou, C. T., "Theoretical Considerations of the Partion Uptake of Nonionic Organic Compounds by Soil Organic Matter," Soil Science Society of America, Inc., Madison, Wis., 1989; Pignatello, J. J., "Sorption Dynamics of Organic Compounds in Soils and Sediments," In B. L. Sawhney et al., Ed. Reactions and Movement of Organic Chemicals in Soils, Soil Science Society of America, Inc., Madison, Wis., 1989).

The efficiency of land treatment systems is generally considered to be directly dependent on the soil organic matter content. The average organic matter content of most good agricultural soils lies within the range of 1 to 5 percent (McGraw-Hill Encyclopedia of Science & Technology, Soil, McGraw-Hill Book Co., New York, N.Y. 1987). As the organic matter content of soil increases, the cation exchange capacity (CEC) of the soil also generally increases; i.e., a soil's ability to adsorb waste materials, particularly heavy metals, is highly correlated with the soil organic matter content. However, the limiting factor in land treatment of wastewaters is generally not organic matter content or the CEC; it is primarily based on soil permeability. As the CEC increases, there is usually an increase in clay content of natural soils, and a subsequent decrease in the ability of water to infiltrate and take advantage of the binding sites for purification. For this reason, land treatment of wastewaters requires large surface areas, and can usually be applied only in rural areas or for smaller municipalities. To minimize land area requirements, a soil-like material with a high percentage of stable organic matter, a high CEC, and a high permeability rate is required.

While these methods can be efficient if adequately sized and/or, if soil and groundwater conditions are appropriate, they require relatively large land areas for effective treatment. Land availability and costs are usually not a problem outside of urban areas. However, in urban areas, land costs are high and, in many instances, required land for these conventional storm water treatment technologies is simply not available at any cost. In addition, due to evidence that heavy metals tend to accumulate and concentrate in treatment pond, wetland, or infiltration basin sediments (Nightingale, H. L., "Accumulation of As, Ni, Cu, and P in Retention and Recharge Basins Soils From Urban Runoff," Water Resources Bulletin 23(4):663-671, 1987; Mesuere, K. et al., "Behavior of Runoff-Derived Metals in a Detention Pond System," Water, Air and Soil Pollution 476:125-138, 1989), there is increasing concern over the long-term environmental consequences of such accretion on underlying groundwaters. There also appears to be increasing potential for bio-accumulation of heavy metals and other toxins by the fauna and flora of pond or wetland systems used for storm water treatment.

The type and strength of pollutants found in storm waters will vary greatly and depend on such factors as rainfall intensity, population and traffic density, season, proximity of industrial facilities, and other land use factors. Pollutants found in typical storm water runoff from highway structures in the United States is shown in the following Table 1:

TABLE 1

| Pollutant Group | Parameter | Concentrations (mg/l) Average | Range | Sources | Examples |
| --- | --- | --- | --- | --- | --- |
| Particulates | TS | 1147 | 145-21640 | Tire, Brake & Pavement Wear, Car Exhaust, Mud & Dirt Accumulated on Vehicles | Dust & Dirt, Stones, Sand, Gravel, Grain, Glass, Plastics, Metals, Fine Residues |
| | TVS | 242 | 26-1522 | | |
| | TSS | 261 | 4-1656 | | |
| | TVSS | 77 | 1-837 | | |
| Heavy Metals | Cd | 0.04 | 0.01-0.40 | Lead, Zinc, Iron Copper, Nickel, Cadmium, Mercury | |
| | Cr | 0.04 | 0.01-0.14 | | |
| | Cu | 0.103 | 0.01-0.88 | | |
| | Fe | 10.3 | 0.1-45.0 | | |
| | Ni | 9.92 | 0.1-49.0 | | |
| | Pb | 0.96 | 0.02-13.1 | | |
| | Zn | 0.41 | 0.01-3.4 | | |
| Organic Matter | BOD5 | 24 | 2-133 | Vegetation, Dust & Dirt, Humus, Oils, Fuels | Vegetation, Litter, Animal Droppings, Motor Fuels & Oils |
| | TOC | 41 | 5-290 | | |
| | COD | 14.7 | 5-1058 | | |
| | Oil & Grease | 9.47 | 1-104 | | |
| Pesticides/ Herbicides | Dieldrin (ppb) | 0.005 | 0.002-0.007 | Weed Killers | Right-of-Way Maintenance |
| | Lindane (ppb) | 0.04 | 0.03-0.05 | | |
| | PCB's (ppb) | 0.33 | 0.02-8.89 | | |
| Nutrients | TKN | 2.99 | 0.1-14.0 | Nitrogen, Phosphorus | Fertilizers |
| | NO2 + NO3 | 1.14 | 0.01-8.4 | | |
| | PO4 | 0.79 | 0.05-3.55 | | |
| Pathogenic Bacteria (Indicators) | Total C Fecal C | | | Coliforms | Soil, Litter, Excreta, Bird & Animal Droppings |

In the case of particulates, the average levels for storm waters are higher than those for typical municipal wastewater or sewage in the United States in total solids (TS), total volatile solids (TVS) and total suspended solids (TSS). In addition, the extreme upper range limits found in storm waters can exceed that for wastewaters, e.g., in total volatile suspended solids (TVSS), chemical oxygen demand (COD), and oil and grease. In the case of nutrients, the typical values in storm waters are lower than those for typical wastewater. This clearly indicates the potentially serious adverse impact of storm water runoff on natural receiving water systems.

Storm water also differs from wastewater in other ways. Unlike wastewater, which flows more or less continuously year around, storm water is intermittent, and usually shows seasonal peaks. Pollutant concentrations in storm water, in addition to being highly dependent on localized factors, are also correlated with rainfall interval spacing. In other words, the longer the time span between storms, the greater the pollutant concentration when a rainfall event occurs. This is due to the continual accretion of pollutants on the drained surfaces over time. Thus, potential damage to receiving water ecosystems is greatest after a prolonged dry spell, such as occurs during summer periods over much of the west coast of the United States, when the first storms of the fall season wash particularly concentrated accumulations of toxic materials off roadways and other surfaces. These first flush events occur when receiving streams are at low flow and the dilution of pollutants from storm water is minimal. Thus, these events cause the greatest impacts on receiving water quality. However, this factor is heavily rainfall intensity dependent. Therefore the heaviest pollutant loading at the end of a dry spell may not occur during the first storms, if these storms are not of sufficient strength to fully flush the receiving basin deposition surfaces.

Within a particular storm event, there is also what is known as the "first flush" phenomenon. Generally, the first flush occurs during the first half-hour or so, when the rain is flushing the amassed buildup of pollutants which have accumulated during the interval since the preceding storm, and pollution loadings are highest. Even if the storm lasts several hours or more, contamination levels during the remainder of the event are usually low or even undetectable.

With the foregoing considerations in mind, it is one object of the present invention to provide a storm water runoff treatment system that is capable of accepting and treating pollutant levels which can be greater than those commonly seen in domestic wastewaters and are sometimes more typical of industrial wastewater strengths and compositions.

It is another object of the present invention to provide a storm water runoff treatment system that is capable of treating high volumes of heavily contaminated storm water on an almost instantaneous basis with intervening and often prolonged dry periods.

It is yet another object of the present invention to provide a storm water runoff treatment system that is capable of treating particularly heavy pollutant loadings during the first half-hour or so of a storm water runoff event, followed by influent of greatly diminished concentrations.

SUMMARY OF THE INVENTION

It has now been discovered that these and other objects may be achieved by passing storm water runoff through a bed of high quality leaf compost material to remove pollutants from the runoff prior to discharge into a water receiving system, such as a river, lake or storm water drainage system. Another aspect of the invention provides an apparatus for treating storm water runoff having at least one chamber for containing compost defined by a pair of opposed side walls and a pair of opposed end walls; an influent pathway for providing storm water to the compost chamber, a drain field positioned beneath the compost chamber for receiving storm water from the compost chamber, a layer of water permeable material interposed between the compost chamber and the drain field providing fluid communication between the compost chamber and the drain field while preventing the flow of compost material into the drain field, and a storm water outlet in fluid communication with the drain field for discharging treated storm water from the apparatus.

The storm water treatment method and apparatus of the invention uses a high-grade leaf compost as a filtration, ion exchange and adsorption medium for removal of contaminants from the storm water. In addition, the use of compost introduces the potential for microbial destruction or bioremediation of captured organics, such as oils and greases, petroleum hydrocarbons, solvents, pesticides and herbicides which are captured or bound by the compost medium.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 1 is a plan schematic view of an illustrative storm water treatment apparatus of the invention;

FIG. 2 is a side cross-sectional view of the illustrative storm water treatment apparatus of FIG. 1, taken along the line 2—2 in FIG. 1;

FIG. 3 is an end cross-sectional view of the illustrative storm water treatment apparatus of FIG. 1, taken along the line 3—3 in FIG. 1;

FIG. 5 is an end cross-sectional view of the illustrative storm water treatment apparatus of FIG. 4, taken along the line 5—5 in FIG. 4;

FIG. 6 is a side elevational view of another alternative embodiment of the storm water treatment apparatus of the invention, shown partially in cross section; and FIG. 7 is end elevational view of the water flow spreader of the apparatus of FIG. 6.

DETAILED DESCRIPTION OF THE PREFERRED EMBODIMENT

Figure 4:
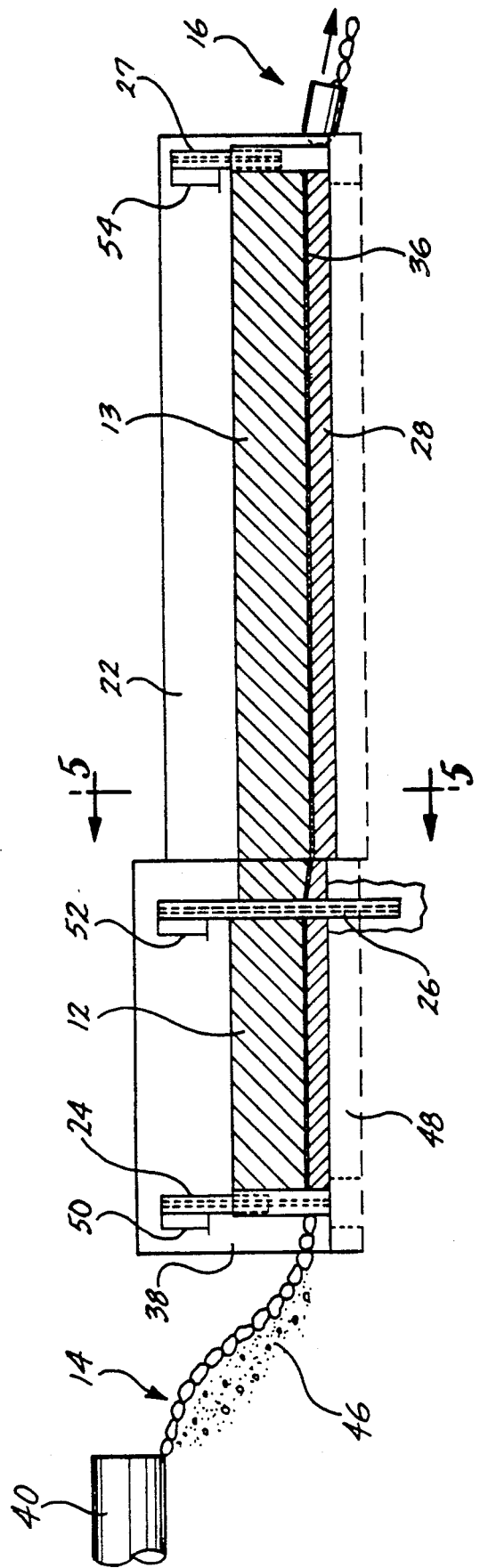
FIG. 4 is a side elevational view of an alternative embodiment of the storm water treatment apparatus of the invention, shown partially in cross section.

In accordance with the present invention storm water runoff is treated by passing the runoff through a bed of high quality leaf compost material to remove pollutants from the runoff prior to discharge into a water receiving system, such as a river, lake or storm water drainage system.

An illustrative storm water treatment apparatus 10 of the invention is illustrated in FIGS. 1-3, wherein compost beds 12, 13 are interposed in a water flow path between storm water runoff influent means 14 and treated water effluent means 16. Compost beds, 12, 13 are retained in one or more compost chambers 18, 19 formed by compost chamber side walls 20, 22 and end walls 24, 26, 27. Although two compost chambers 18, 19 are shown in FIGS. 1 and 2, the apparatus may be designed to comprise only one compost chamber, or may comprise three or more compost chambers, as desired for a particular application. As best illustrated in FIGS. 2 and 3, a drain field 28 is located beneath the compost beds, forming the support structure for the bottom of compost chambers 18, 19. In the embodiment shown in FIGS. 1-3, drain field 28 comprises a plurality of perforated drain pipes 30, 32 longitudinally arranged beneath the compost chambers 18, 19 in a bed of drain field rock 34. A layer of water permeable material 36 is interposed between compost bed 12 and drain field 28, and is designed and adapted to provide free fluid communication between the compost bed and the drain field while retaining compost fines in the compost bed. In a presently preferred embodiment, the layer of water permeable material comprises a nonwoven construction fabric having a permeability of at least about 0.1 cm/sec, more preferably at least about 0.2 cm/sec, a permittivity of at least about 50 gal/min/ft$^2$, more preferably at least about 100 gal/min/ft$^2$, and an apparent opening size of at least about US sieve number 60, more preferably at least about US sieve number 70. In a presently particularly preferred embodiment, the layer of water permeable material comprises nonwoven construction fabric 4545 available from the AMOCO Corporation, Chicago, Ill.

During a storm water runoff event, storm water runoff is discharged into storm water forebay 38 through storm water feed pipe 40. When the forebay fills, excess storm water flows over end wall 24 and into the compost bed 12 in compost chamber 18. Due to the permeability of compost bed 12, the stormwater flows downwardly through the compost bed 12, through the layer of water permeable material 36 and into drain field 28. If the entry rate of storm water entering compost chamber 18 exceeds the flow capacity of compost bed 12, excess storm water builds up in compost chamber 18, and overflows end wall 26 into compost bed 13 in compost chamber 19. In a similar manner, the storm water flows downwardly through the compost bed 13, through the layer of water permeable material 36 and into drain field 28. If the entry rate of storm water entering compost chamber 19 exceeds the flow capacity of compost bed 13, excess storm water builds up in compost chamber 19, and overflows end wall 27 into the treated storm water effluent means 16. Storm water entering the drain field 28 from the compost beds 12, 13 is collected by the perforated drain pipes 30, 32 and is discharged from the apparatus 10 as treated effluent. As shown in FIG. 3, representative end wall 26 may be provided with one or more generally "V"-shaped or trapezoidal notch structures 42 on the upper edge 44 of the end wall to facilitate uniform distribution of storm water overflowing the end wall onto compost in the receiving compost bed.

The illustrative embodiment shown in FIGS. 1-3, as described above, is particularly suitable for large capacity applications and may, if desired, be constructed directly in the ground with apparatus side walls 20, 22 being formed by the excavated ground. In such applications, a layer of water impermeable material (not shown) is preferably used to line the excavation beneath drain field 28 and the side walls 20, 22 to prevent the storm water from exiting the apparatus except through the drain field or excess water over flow.

A similar, but alternative embodiment of the storm water treatment apparatus 10 is shown in FIGS. 4 and 5, in which corresponding elements have been numbered as hereinbefore described. In the embodiment of FIGS. 4 and 5, apparatus sidewalls 20, 22 have been provided in generally vertical orientation, and together with end walls 24, 26, 27, are supported in the ground 46 by footer material 48, such as a concrete footer material. As best shown in FIG. 4, end walls 24, 26, 27 have additionally been provided with scum baffles 50, 52, 54, respectively, which serve to prevent or reduce the amount of floatable materials which overflow the end walls.

Yet another embodiment of the apparatus of the present invention, particularly adapted for use in limited runoff applications where usable ground space is limited, such as in shopping centers, gas station parking areas, commercial areas, industrial areas and the like, is shown in FIGS. 6 and 7. Storm water treatment apparatus 10 is provided in a closed container, such as closed utility vault 56. As shown in FIG. 6, fluid communication is provided into vault 56 through storm water feed pipe 40 located in an upper portion of the influent end 58 of the vault, and out of the vault through treated storm water discharge pipe 60 located in a lower portion of the effluent end 62 of the vault. Water flow distributors 64, 66 are provided at the upper ends of compost chamber end walls 24, 26, respectively, to uniformly distribute storm water overflowing the end walls. As shown in FIG. 7, water flow distributors 64, 66 comprise a distributor box 68 having a peripheral flange 70 adapted for mounting the distributor box to the upper portion of the end wall, such as through mounting holes 72. A plurality of orifices 74, 76, 78 are provided in bottom wall 80 of the distributor box, providing fluid communication with water flow distributor flanged inflow pipes 82, 84, 86, respectively, that are mounted on the bottom wall 80 of the distributor box, such as by means of bolts 88. The flanged inflow pipes 82, 84, 86 are designed to have a length extending below the anticipated water level in storm water forebay 38, or compost chamber 18, to prevent floatable materials from overflowing the respective end walls of the apparatus. The embodiment of FIG. 6 may be further provided with a water deflector plate 90 adapted to disperse storm water entering compost chamber 18 through water flow distributor 64 and thereby prevent erosion in the compost bed 12. Scum baffle 92 may also be provided to further prevent the overflow of floatable materials over end wall 26 and out of the treatment apparatus. Except as described above, the embodiment of FIGS. 6 and 7 operates in a manner similar to the embodiments of FIGS. 1-5.

It is an important aspect of the present invention that compost used in the compost beds be of high qualify and of primarily deciduous leaf origin. Criteria for selection of useful compost materials is hereinafter described in detail.

Composting is the process whereby natural soil microorganisms (bacteria, fungi, etc.) decompose dead vegetative and/or animal matter under moist, aerobic conditions, and turn it into a stable, organic rich, final product termed compost (Biddlestone, A. J. et al., "Composting," In M. Moo-Young Ed., Comprehensive Biotechnology, Pergamon Press, New York, N.Y., 1059-1070, 1985). Composting of waste organics has recently become more widespread in the United States as a means of preserving landfill space and for the recycling of these organics in a stabilized form as soil amendments. Most people have some familiarity with compost and composting. Yet it is seldom realized how complex the microbial and chemical processes involved in composting are, how variations in types of compost and potential end uses are based on feed-stock and processing differences, or what the potential value of high quality compost products as adsorbent media for pollution control applications is.

Recently composting and compost have received official definitions from the European Council of Economic Communities (Zucconi, F. et a., "Specifications for Solid Waste Compost," BioCycle (May/June):56-61, 1987b; Zucconi, F. et al., "Compost Specifications for the Production and Characterization of Compost from Municipal Solid Waste," In M. de Bertoldi et al., Ed., Compost: Production, Quality and Use, Elsevier Applied Science, New York, N.Y., 30-50, 1987a). These are:

Composting—a controlled biooxidative process that: 1) involves a heterogenous organic substrate in the solid state; 2) evolves by passing through a thermophilic phase and a temporary release of phytotoxin; and 3) leads to the production of carbon dioxide, water, minerals and stabilized organic matter (Compost).

Compost—the sterilized and sanitized product of composting which is beneficial to plant growth. It has undergone an initial, rapid stage of decomposition and is in the process of humification.

Perhaps the key word in the above definition of compost is the term humification. In addition to its degradative function (i.e., the microbial breakdown of organics with production of carbon dioxide and water as final end products), properly operated composting also results in synthesis—the production of high molecular weight, extremely stable, organic substances termed humus or humic compounds.

HUMUS OR HUMIC COMPOUNDS

Humus or humic compounds is a generic term for a group of natural products which are probably the most widely distributed organic carbon-containing materials in terrestrial and aquatic environments. They are dark-colored, predominately aromatic (i.e., formed of chains of 6 carbon atom ring compounds), slightly acidic, hydrophobic, molecularly flexible polyelectrolytes. They are formed from the chemical and biological degradation of plant and animal residues and from the synthetic activities of microorganisms. They are though to be primarily derived from lignin compounds (Tan, K. H., "Principles of Soil Chemistry," Marcil Dekker, Inc., New York, N.Y., 1987). Humic compounds are often loosely referred to as soil organic matter, although soil organic matter has other constituents including complex and stable polysaccharides and living and dead microbial biomass, which also functions in an adsorbent capacity (Bell, J. P. et al., "Removal of Hazardous Organic Pollutants by Biomass Adsorption," *Journal WPCF* 59:191-198, 1987b; Bell, J. P. et al., "Removal of Hazardous Organic Pollutants by Adsorption on Microbial Biomass," *Water. Sci. Tech.* 19:409-416, 1987a; Tsezos, M. et al., "Significance of Biosorption for the Hazardous Organics Removal Efficiency of a Biological Reactor," *Water. Res.* 22:391-394, 1988; Tsezos, M. et al., "Comparison of the Biosorption and Desorption of Hazardous Organic Pollutants by Live and Dead Biomass," *Water Res.* 23(5):561-568, 1989).

Humic compounds are partitioned into three main fractions, based on their solubility in alkali and acid—fulvic acid, humic acid and humin. Humic compounds exhibit relatively long mean residence times in a silt loam soil, indicating that humic compounds are highly resistant to microbial degradation. Thus, used as an adsorbent medium as in the case of the compost storm water filter, they should not degrade within the typical residence time in the system and release the adsorbed pollutants.

Properties of humus which are of functional significance in the use of compost as an adsorbent medium for removing pollutants from storm water include color, water retention, combination with clay minerals, chelation, solubility in water and pH.

The dark color typical of humus-rich composts absorbs heat from the sun and results in more rapid warming of the compost. While not a critical factor in the use of compost as a storm water filter or ion exchange medium, it will accelerate bioremediation rates on captured organics such as oils and greases, and will make the system more quickly operable in areas where winter freezing takes place.

A humus-rich compost will also bind and retain moisture through physical-chemical bonding mechanisms. Previous tests have shown that a humus-rich compost, such as deciduous leaf compost, will remain uniformly moist thorough a 3-month protracted dry period under summer conditions, with only the top inch or so losing moisture. A poor quality compost will dry completely under the same conditions. Moisture retention is a critical factor in that, if the compost bed storm water were to dry out under summer time conditions or during a prolonged drought, shrinking and cracking of the surface could produce hydraulic short-circuiting during the first storm of the following season. In addition, it is possible that excessive drying would decrease the binding of pollutants already captured during preceding storm events and allow wash out of these contaminants. The maintenance of uniform moisture conditions also permits bioremediation of previously captured organics to continue throughout dry periods.

It is well known that the addition of compost to clay soil will loosen the soil and enhance drainage or permeability to water. The organic material in the compost is known to bind with clay particles to form aggregates. This effect also increases gas exchange capacity, permitting maintenance of aerobic conditions. In using compost as a filtration, ion exchange and adsorbent medium for storm water, this factor is critical in that much of the suspended solids carried in the storm water influent may consist of fine clays carried off through erosion. The reaction of the compost organics with these clay particles helps to maintain permeability through the filtration medium, and minimize potential blockage effects.

Chelation is a physical-chemical process in which a contaminant is captured by a bridging effect between two or more coordination positions. The structure of humic compounds, and the availability of numerous potential coordination positions, provides a strong chelating effect in a humus-rich compost.

High molecular weight humic compounds have a low solubility in water, thus minimizing leaching effects. This attribute is critical, both in preventing loss of the humic compounds as storm water flows through, as well as minimizing loss of contaminants adsorbed to the humus.

The solubility of organic matter in compost decreases and the binding capabilities of compost increases, as the compost matures and increases its content of humic compounds. Mature compost has significantly greater binding and retention capabilities than immature or raw compost, as well as a decreased propensity for the leaching of organic matter. This is primarily an effect of the formation of stable, nonwater soluble, humic compounds in the mature compost.

A mature compost also acts as a strong buffering agent, maintaining the pH in the slightly acid, neutral or slightly alkaline range. This capability for buffering pH represents another critical perimeter as metabolism by microorganisms, which would occur as organic material is removed from the storm water, could tend to reduce pH, due to carbon dioxide and organic acid production. Such reduction would then effect the release of other bound pollutants, particularly heavy metals. Under acid conditions, the mobility of most heavy elements increases. It is for this reason that sludge and sludge compost additions to soil require a pH of 6.5 or higher (See Section 2.2) to ensure consistent binding of heavy metal contaminants. The inherent pH buffering action of a high quality leaf compost acts to minimize this potential release mechanism.

A mature and well humified leaf compost also acts as an ion exchange medium. Lighter elements, such as potassium, sodium, calcium, and magnesium, are exchanged for heavier elements such as cadmium, lead, nickel and zinc, thus removing these latter pollutants from the storm water flow. In order to ensure reliable removal and long-term retention of these heavy metal contaminants, it is necessary to maintain the pH in the slightly acid, neutral, or slightly basic range through the buffering action of the compost as explained above. Compost also acts as an anion exchanger, with the potential for removing such anions as phosphorous and nitrate, although this capacity is not as great as its cation exchange capability.

Compost binds and retains many essential micronutrients essential for plant as well as microbial reproduction and growth. This property becomes essential in the use of compost as a storm water treatment medium in that it provides necessary trace elements required for microbial breakdown of adsorbed organics such as oil and grease and petroleum hydrocarbons.

Well humified composts also capture many organic compounds through a variety of binding mechanisms, as has been shown in air pollution treatment systems, where a wide variety of gaseous organic as well as inorganic pollutants are adsorbed and removed from the air stream (Smith, K. A. et al., "Sorption of Gaseous Atmospheric Pollutants by Soils," *Soil Science* 116:313-319, 1973; Bohn, H. L., "Soil and Compost Filters of Malodorant Gases," *Journal APCF* 25:953-955, 1975; Bohn, H. L., "Compost Scrubbers of Malodorous Air Streams," *Compost Sci.* (Winter): 15-17, 1976; Rands, M. B. et. al., "Compost Filters for H2S Removal From Anaerobic Digestion and Rendering Exhausts," *Journal WPCF* 53:185-189, 1981; Pomeroy, R. D., "Biological Treatment of Odorous Air," *Journal WPCF* 54:1541-1545, 1982; Terasawa, M. et al, "Soil Deodorization Systems," *BioCycle* 27:28-32, 1986). In using compost as a storm water treatment medium, this attribute helps insure the capture of organic pollutants such as oil and grease, petroleum hydrocarbons, organic solvents, pesticides and herbicides. The capture of these compounds permits the microbial destruction or bioremediation of these pollutants, with the release of carbon dioxide and water as breakdown products. This prevents the accumulation of most toxic organics in the compost medium. The capability of microorganisms to metabolize toxic organics in soil, compost and aquatic systems, which is called bioremediation, is well recognized (De Renzo, D. J., Ed. "Biodegradation Techniques for Industrial Organic Wastes," Noyes Data Corp., Park Ridge, N.J., 1980; Kobayashi, H. et al., "Microbial Removal of Hazardous Organic Compounds," *Environ. Sci. Tech.* 16:170A-183A, 1982; Alexander, M., "Biodegradation of Organic Chemicals," *Environ. Sci. Tech.* 18:106-111, 1985; Cabridenc, R., "Degradation by Microorganisms in Soil and Water," In P. Sheehan et al. Ed., Appraisal of Tests to Predict the Environmental Behaviour of Chemicals, John Wiley & Sons, New York, N.Y., 1985; Fuller, W. H. et al., "Soils in Waste Treatment and Utilization," Vol. I, Land Treatment, CRC Press, Inc., Boca Raton, Fla., 1985; Savage, G. M. et. al., "Disposing of Organic Hazardous Wastes by Composting," *BioCycle* (January/February): 31-34, 1985; Grady C. P. L., "Biodegradation of Hazardous Wastes by Conventional Biological Waste Treatment," *Hazardous Wastes Hazardous Mat.* 3:333, 1986; Weber, W. J. et. al., "Fate of Toxic Organic Compounds in Activated Sludge and Integrated PAC Systems," *Water Sci. Tech.* 19:471-482, 1986; Sims R.C. et. al., "Treatment Potential for 56 EPA Listed Hazardous Chemicals in Soil," U.S. Environmental Protection Agency, EPA-600/S6-88/001, 1988; Alexander, M. et. al., "Kinetics of Biodegradation in Soil," In B. L. Sawhney et. al., Ed. Reactions and Movement of Organic Chemicals in Soils, Soil Science Society of America, Inc., Madison, Wis. 243-269, 1989; Golueke, C. G. et. al., "Biological Treatment for Hazardous Wastes," *BioCycle* (May):70-71, 1989; Hyde, C. et. al., "Bioremediation," *Haz. Waste Mgt. Mag.* (April):14-16, 1989; Speitel, G. E. et. al., "Biodegradation of Trace Concentrations of Substituted Phenols in Granular Activated Carbon Columns," *Environ. Sci. Tech.* 23:68, 1989; Stenstrom M. K. et. al., "Treatment of Hazardous Substances in Wastewater Treatment Plants," *Environmental Progress* 8:107, 1989; Torpy, M. F. et. al., "Biological Treatment of Hazardous Waste," *BioCycle* (May):80-86, 1989; Torpy, M. F. et. al., "Biolgical Treatment of Hazardous Waste," *Pollution Engineering* 21(5): 80, 1989; Grady, C. P. L., Jr., "Biodegradation of Toxic Organics: Status and Potential," *Journal of Environ. Eng.* 116(5):805-828, 1990).

To summarize, a well humified compost has many attributes which permit its potential use as both a physical filter, for removing suspended particulates, and as a "molecular" filter, for removal of heavy metal, nutrient, and organic pollutants from storm water. The molecular binding activities and capabilities of humic substances in compost are particularly complex and broad-spectrum in action and precise mechanisms still only partially understood (see Kirkham, M. B., "Organic Matter and Heavy Metal Uptake," *Compost Science* (Jan.-Feb.):18-21, 1977; Service, C. E., "Exchangeable Cations, Cation Exchange Capacity and Base Saturation and its Relationship to Soil Fertility," Washington State University, Pullman, Wash. 1980; Scheunert, I. et. al., "Predicting the Movement of Chemicals Between Environmental Compartments (air-water-soil-biota)," In P. Sheehan et. al. Ed., Appraisal of Tests to Predict the Environmental Behavior of Chemicals, John Wiley & Sons, Inc., New York, N.Y., 285-232, 1985; Sposito G., "Sorption of Trace Metals by Humic Materials in Soils and Natural Waters," CRC Critical Reviews in Environmental Control 16:193-229, 1986; Kotuby-Amacher, J. et. al., "Factors Affecting Trace Metal Mobility in Subsurface Soils," U.S. Environmental Protection Agency EPA-600/S2-88/036, 1988; Chiou, C. T., Theoretical Considerations of the Partion Uptake of Nonionic Organic Compounds by Soil Organic Matter," Soil Science Society of America, Inc., Madison, Wis. 1989; Pignatello, J. J., ""Sorption Dynamics of Organic Compounds in Soils and Sediments," In B. L. Sawhney et. al. Ed., Reactions and Movement of Organic Chemicals in Soils, Soil Science Society of America, Inc., Madison, Wis. 45-80, 1989; Senesi, N. et. al., "Interactions of Toxic Organic Chemicals with Humic Substances," In Z. Gerstl et. al. Ed., Toxic Organic Chemicals in Porous Media, Springer-Verlag, New York N.Y. 37-90, 1989, Sposito, G., "The Chemistry of Soils," Oxford University Press, New York, N.Y. 1989; Westall, J. C. et. al., "Adsorption of Organic Cations to Soils and Subsurface Materials," U.S. Environmental Protection Agency, EPA-600/S2-90/004, 1990; Clapp, C. E. et. al., "Interactions Between Organic Macromolecules and Soil Inorganic Colloids and Soils," In H. G. Bolt et. al. Ed., Interactions at the Soil Colloid—Soil Solution Interface, Kluwer Academic Publishers, Boston, Mass. 409-468, 1991; De Boodt, M. F., "Application of the Sorption Theory to Eliminate Heavy Metals From Waste Waters and Contaminated Soils," In G. H. Bolt et. al. Ed., Interactions at the Soil Colloid—Soil Solution Interface, Kluwer Academic Publishers, Boston, Mass., 293-322, 1991; Forstner, U., "Soil Pollution Phenomena—Mobility of Heavy Metals in Contaminated Soil," In G. H. Bolt et. al. Ed., Interactions at the Soil Colloid—Soil Solution Interface, Kluwer Academic Publishers, Boston, Mass. 543-582, 1991; Hayes, M. H. B. et. al., "Soil Colloids and the Soil Solution," In G. H. Bolt et. al. Ed., Interactions at the Soil Colloid—Soil Solution Interface, Kluwer Academic Publishers, Boston, Mass., 1-33, 1991; Hayes, M. H. B. et. al., "Interactions Between Small Organic Chemicals and Soil Colloidal Constituents," In G. H. Bolt et. al. Ed., Interactions at the Soil Colloid—Soil Solution Interface, Kluwer Academic Publishers, Boston, Mass., 323-407, 1991; MacCarthy, P. et. al., "Complexation of Metal Ions by Humic Substances: Fundamental Considerations," In G. H. Bolt et. al. Ed., Interactions at the Soil Colloid—Soil Solution Interface, Kluwer Academic Publishers, Boston, Mass., 469-489, 1991; Swift, R. S. et. al., "Micronutrient Adsorption by Soils and Soil Colloids," In G. H. Bolt et. al. Ed., Interactions at the Soil Colloid—Soil Solution Interface, Kluwer Academic Publishers, Boston, Mass., 257-292, 1991). Since storm waters contain a complex mixture of solids and inorganic and organic compounds, its relatively non-selective binding and adsorption capabilities offer good potential for removal of many contaminating substances.

In accordance with the foregoing, composts useful in the practice of the invention preferably exhibit high levels of maturity and humification, exhibit a high potential for the capture of a broad spectrum of pollutants, exhibit low initial contaminant levels, are permeable to the flow of storm water runoff through the compost bed and provide an ideal site for the bioremediation of the organic portion of captured pollutants, as is more fully defined below:

1. Maturity—As used herein, a compost is defined as mature or stable when there is little or no degradable organic matter left to support active microbial metabolism. Although a high-grade compost will still contain a significant proportion of organic matter, primarily in the form of humic compounds, these organics are very complex, stable and not subject to rapid microbial attack. Mature composts are usually dark in color and have a rich, earthy smell. There are still no widely accepted quantitative tests for compost maturity (Saviozzi, A. et. al., "Maturity Evaluation of Organic Waste," *BioCycle* (March):54-56, 1988) and the best indicator remains individual experience, combined with knowledge of the feed stock, processing methods and duration of processing. One quantitative measurement of maturity which is beginning to gain acceptance is the wet respiration test, which measures microbial metabolic rates directly as oxygen consumption. A low respiration rate is an indication of maturity. The water extract test also provides useful information regarding the maturity of a particular compost (Saviozzi, A. et. al., "Compost Maturity by Water Extract Analysis," In M. De Bertoldi e Production, Quality and Use, Elsevier Applied Science, New York, N.Y. 359-367, 1987).

2. Humified—The degree of humification and the maturity of a compost are closely interrelated. A compost with a high percentage of humic compounds will be mature. A standardized test for the degree of humification of a compost is still under development (see Saviozzi, A. et. al., "Maturity Evaluation of Organic Waste," *BioCycle* (March):54-56, 1988). Judgment of the degree of humic compound formations again depends upon experience, and the analysis of data derived from indirect testing methods such as the water extract and wet respiration tests.

3. Low Contaminant Levels—Many waste derived composts will have relatively high levels of potentially toxic contaminants—particularly heavy metals. Composts derived from sewage sludges and mixed municipal solid wastes have higher risk factors in this regard. These composts can safely be applied to land with little or no environmental risk. However, it would be unwise to use them in a situation such as a storm water treatment reactor, with large volumes of water flowing through the compost, due to the increased risk of leaching a portion of these contaminants into the receiving waters. Composts derived from leaf wastes have low contaminant levels and are more suitable for this particular application.

4. Permeable—One of the most important attributes is that the compost be highly permeable to water. Preferably, the compost beds of a treatment system of the present invention will be sufficiently permeable to exhibit a flow rate of at least about 0.5 gallons/minute/square foot of compost bed surface area, more preferably at least about 1.0 gallon/minute/square foot of compost bed surface area, and most preferably at least about 2.0 gallons/minute/square foot of compost bed surface area. This precludes those composts with a very fine texture. If desired, permeability enhancing materials, such as gravel, may be included in the compost bed to obtain desired permeability rates. In a presently particularly preferred embodiment, at least about 5 percent by dry weight, more preferably at least about 10 percent by dry weight and most preferably at least about 15 percent by dry weight of gravel or crushed rock is included in the compost bed to enhance bed permeability.

In view of the foregoing parameters, the presently most preferred compost for use in the practice of the present invention is leaf compost. Although fall leaves are widely available, and constitute a disposal problem throughout much of the United States, specialized feed stock composting of leaves is not yet widely practiced. However, fall leaves may be readily collected and properly composted at a central facility, producing a compost of outstanding quality. The leaves may be turned at weekly intervals by a mechanical turner, ensuring good size reduction, aeration, and rapid maturation. Preferably, the leaf compost starting material will comprise less than about 15 percent by dry weight, more preferably less than about 10 percent by dry weight and most preferably less than about 5 percent by dry weight of non-leaf origin organic matter, such as tree bark and woody sticks or chips. The final product is a rich, dark, humus-rich compost. In addition, when leaf materials are collected from road areas, they may contain sufficient road gravel to provide good flow permeability to the resulting compost, as described above.

EXAMPLES

Example 1

Leaf Compost Characteristics

Samples of leaf compost were obtained from the City of Portland, Oreg., from a city street leaf collection and composting project. The leaf compost was characterized as described in detail below.

For permeability tests, a special constant-head permeameter was designed and constructed, consisting of a six-inch diameter PVC pipe, four feet in length. Two PVC overflow pipes, each three-quarter inches in diameter, were attached through holes in the side of the main pipe to maintain a constant head of either one foot or two foot (with the lower constant head overflow blocked off) above an 18-inch deep compost bed. Beneath the compost bed, a rock underdrain was provided, consisting of washed gravel, of the type commonly used in drainage applications. In addition to maintaining flow rates by acting as an underdrain, the rock also acted to intercept and filter particulate matter released from the compost. This particulate matter release was observed only during the first five minutes of initial flow and was not observed in subsequent flow applications using the same compost. To further prevent compost particles from filtering into the rock underdrain and minimize potential blockage problems, various woven and non-woven filter fabrics were tested, positioned between the compost bed and the rock underdrain layer. One non-woven fabric, Amoco 4545, AMOCO Corporation, Chicago, Ill., proved successful in this application, and was used for longer-term permeability tests and installation in the full-scale prototype facility as described in Example 2, below.

Tap water was introduced at the top of the permeameter at a rate exceeding flow through the compost bed. Excess water drained out the overflow, thus maintaining the constant head. Water draining through the compost bed was collected in a container in which the permeameter was placed. The rate of flow through the compost bed was measured at specified times using a gallon container and a stop watch. Permeameter tests were conducted under varied conditions for approximately 400 hours.

Representative data from a series of these permeability tests, using one foot of head, and the combination of rock underdrain, non-woven fabric, and 18-inch deep bed of the leaf compost described above, are given in Tables 2, 3 and 4.

TABLE 2

| | Compost Permeability |
|---|---|
| Time (hours) | Flow Rate (gpm/ft$^2$) |
| 0 | 2.3 |
| 6 | 0.7 |
| 32 | 0.3 |
| 48 | 0.3 |
| 54 | 0.3 |

Table 2 demonstrates flow rates under long term, non-reoccurring event flow conditions, such as might be encountered during a protracted storm period. In this type of test, flow through the compost bed was maintained for 54 hours. During this test, initial flow was high, but tapered off after several hours. After approximately 24 hours, a steady state flow was attained at about 15 percent of the initial rate. This rate continued without any further diminution for the duration of the test period.

Table 3 illustrates the effects of short term, reoccurring storm-event cycles. This test was designed to model the effect of a storm, lasting several hours, followed by a dry period during which time the compost bed was allowed to drain for periods ranging from 24 hours to two weeks.

TABLE 3

| Reoccurring, Short Term Flow | | |
|---|---|---|
| | Flow Rate (gpm/ft$^2$) | |
| Time (min.) | Test 1 | Test 2 |
| 0 | 3.0 | 2.1 |
| 10 | 2.2 | 1.5 |
| 20 | 1.9 | 1.4 |
| 30 | 1.7 | 1.2 |
| 60 | — | 1.1 |
| 120 | 0.8 | 0.9 |
| Flow stopped 24 hours | yes | yes |
| 0 | 1.5 | 0.8* |
| 10 | 1.5 | 0.7 |
| 20 | 1.4 | 0.6 |
| 30 | 1.3 | 0.6 |
| 60 | 1.1 | 0.6 |
| 120 | 0.9 | 0.7 |
| Flow stopped 1 week | yes | |
| Flow stopped 2 weeks | | yes |
| 0 | 2.1 | 1.8 |
| 10 | 1.9 | 2.0 |
| 20 | 1.8 | 1.7 |
| 30 | 1.5 | 1.5 |
| 60 | 1.5 | 1.4 |
| 120 | 1.4 | 1.2 |

*measured at 6" head

As can been seen in Table 3, there is an initial maximum flow rate at time 0, followed by a decrease in flow to approximately 50 percent of this initial maximum rate after 30 to 40 minutes. When the flow was stopped, and the compost bed permitted to drain for 24 hours, initial flow upon restarting was about 40 to 50 percent of the initial maximum flow. When the bed was allowed to drain for a longer time period, ranging from one to two weeks, initial flow on restart ranged between 80 to 90 percent of initial maximum flow. The reduction in flow with time is believed to be due to the swelling of organics and inorganic oxides in the compost, as they combine with water molecules. The flow characteristics seen are compatible with storm water treatment requirements. During a storm event, the highest pollutant loadings occur during the first half hour or so (first flush) of the storm. This is the time period where maximum treatment requirements exist, and thus maximum permeability of the compost is required. As the storm continues, pollutant loadings decrease significantly, and pollutant removal requirements decrease. In addition, since it is the length of the interval between storm events that determines the amount of build-up of fresh pollutants, closely spaced storm events have reduced treatment requirements.

From these permeability data, it can be seen that a leaf compost storm water treatment bed has the highest flow capacity, and thus the greatest treatment capability, during the first 30 to 40 minutes of a storm event. If rainfall continues at an initial high rate, the compost bed would then begin to by-pass the excess storm water, which would be low in pollutant loadings. If another storm event occurs within 24 hours of the first, permeability rates remain relatively low, but pollutant loading rates would also be reduced. When there is an interval of more than several days between storms, and the bed is allowed to drain, flow capacity is restored. This feature is important because the compost has a finite exchange and adsorption capacity. The capacity is thus used most effectively when pollutant loadings are highest and/or, the period between storm events is increased. Bypassing lightly polluted waters from a longer storm, or from closely spaced storm events, maximizes the life of the compost bed, and allows it to be used to maximum advantage.

Background contamination tests were performed on the leaf compost samples by plasma emission spectroscopy ($Li_2SO_4$—$H_2SO_4$ digestion) to determine the levels of heavy metals, $K^+$, $Na^+$, $Ca^{++}$, and nutrients present in the three separate samples of the Portland leaf compost. The results are shown in the following Table 4:

pared by adding required contaminants to water in quantities approximately double the average storm water concentrations shown in Table 1. The measured concentration of the contaminants in the artificial storm water solution are given in the center column of Table 5 (Artificial Storm Water).

Each test column was first leached three consecutive times with two liters of distilled water (Distilled Water Leachate in Table 5). The leachate was collected separately from each run and analyzed. The results of this distilled water leachate test gives an indication of the inherent binding capacity of a particular compost. Each test column was then leached three consecutive times with two liters of the artificial storm water mixture. This leachate was also collected separately from each run and analyzed individually. The results of these tests are shown in Table 5, giving the value of each pollutant displaced by the three distilled water leachings and by the three artificial storm water leachings.

TABLE 5

| | Leaf Compost Leaching Test | | | | | | |
|---|---|---|---|---|---|---|---|
| Pollutant | Distilled Water Leachate | | | Artificial | Artificial Storm Water Leachate | | |
| mg/l | 1 | 2 | 3 | Storm Water | 1 | 2 | 3 |
| Cd | 0.00 | 0.00 | 0.00 | 0.06 | 0.00 | 0.00 | 0.00 |
| Cr | 0.00 | 0.00 | 0.00 | 0.07 | 0.00 | 0.00 | 0.01 |
| Cu | 0.02 | 0.02 | 0.02 | 0.19 | 0.02 | 0.02 | 0.02 |
| Fe | 1.17 | 1.14 | 1.15 | 20.72 | 1.07 | 1.09 | 1.13 |
| Ni | 0.00 | 0.01 | 0.00 | 18.76 | 0.06 | 0.03 | 0.03 |
| Pb | 0.00 | 0.00 | 0.00 | 1.71 | 0.00 | 0.00 | 0.00 |
| Zn | 0.11 | 0.10 | 0.07 | 0.73 | 0.07 | 0.08 | 0.07 |
| N | 4.10 | 7.86 | 4.48 | 9.20 | 4.32 | 6.94 | 4.40 |
| P | 1.14 | 2.05 | 1.66 | 0.52 | 1.52 | 2.17 | 1.56 |
| K | 19.67 | 26.80 | 24.87 | 1.18 | 29.50 | 32.20 | 31.20 |
| Oil | 0.07 | 0.43 | 0.08 | 83.33 | 0.00 | 0.03 | 0.32 |

TABLE 4

| | Leaf Compost Analysis (Dry Weight) | | | | |
|---|---|---|---|---|---|
| | ppm (dry weight) | | | | |
| Element | Sample 1 | Sample 2 | Sample 3 | Mean | S.D.± |
| Al | 3,112.3 | 3,815.8 | 2,020.8 | 2,982.9 | 904.5 |
| As | 43.0 | 35.0 | 37.0 | 38.3 | 4.2 |
| B | 15.4 | 11.8 | 21.2 | 16.1 | 4.7 |
| Ca | 12,707.5 | 10,298.3 | 13,372.3 | 12,126.0 | 1,617.4 |
| Cd | 4.6 | 0.8 | 1.7 | 2.4 | 2.0 |
| Cr | 8.0 | 5.7 | 7.1 | 6.9 | 1.2 |
| Cu | 54.0 | 46.0 | 58.0 | 52.7 | 6.1 |
| Fe | 2,855.0 | 2,745.0 | 1,939.0 | 2,513.0 | 500.1 |
| K | 4,200.9 | 3,270.0 | 4,268.4 | 3,913.1 | 558.0 |
| Mg | 1,997.3 | 1,624.6 | 2,116.8 | 1,912.9 | 256.7 |
| Mn | 419.0 | 339.0 | 430.9 | 396.3 | 50.0 |
| Na | 1,929.7 | 1,592.9 | 2,171.5 | 1,898.0 | 290.6 |
| Ni | 10.6 | 8.8 | 10.9 | 10.1 | 1.1 |
| P | 1,823.0 | 1,384.0 | 2,005.0 | 1,737.3 | 319.2 |
| Pb | 38.0 | 26.0 | 36.0 | 33.3 | 6.4 |
| Zn | 150.9 | 119.7 | 155.9 | 142.2 | 19.6 |
| N | 0.56 | 0.50 | 0.55 | 0.54 | 0.03 |

The variation within the three samples tested is evident. However, for the heavy metals of environmental importance (Cd, Cu, Ni, Pb, Zn), the levels found and the standard deviation, which quantitatively measures the variation from mean values, are well within acceptable limits.

The binding and absorption capabilities of the leaf compost was further evaluated by means of leaching tests using distilled water (DW), followed by an artificial storm water (ASW) leaching. PVC tubes, 10 cm in diameter, were filled with 30 cm of the leaf compost to be tested. An artificial storm water (ASW) was pre- Additional tests were run on the leaf compost to further characterize it as follows:

1. Wet Respiration Test—Wet respiration tests were performed on two samples of the leaf compost using a Arthur Respirometer. The first sample exhibited a stability index of 39 mg/Kg/hr, indicating a highly stable and mature compost. This compost was about 18 months from time of initial processing on the date of this test, and was from the same batch of compost used in the leachate tests, above. The second sample of compost was about 11 months from the time of initial processing on the date of the test and was sampled from the same compost used in the full-scale prototype facility, described in detail in Example 2 below. The results gave a stability index of 189 mg/Kg/hr, not as good as the previous material (primarily due to age difference) but nevertheless indicative of a suitably stable and mature compost.

2. Cation Exchange Capacity Test (CEC)—A cation exchange capacity analysis was run on a sample of the leaf compost used in the full-scale prototype facility described in detail in Example 2. The CEC was 66.0, which indicates excellent adsorption capacity for heavy metals. 3. Sieve Analysis—Two sets of dry sieve analysis were run on the leaf compost to characterize its size classification. The first sieve analysis was performed using ⅜" and ¼" screens on 133.95 g of leaf compost (dry weight) to determine the percentage of gravel. The weight of the compost components retained by the screens is shown in Table 6:

TABLE 6

Sieve Analysis

Wet Sample = 187.23 g
Dry Sample = 133.95 g

| | Weight (g) | |
|---|---|---|
| 1" Screen Plus = | 13.63 | (Gravel) |
| ¼" Screen Plus = | 14.00 | (Gravel) |
| Receiver = | 106.03 | (Organic) |
| Total = | 133.66 | |

Good permeability to flow of the leaf compost was, in part, due to the presence of this gravel. As shown in Table 6, almost 21 percent of the dry weight of the compost was due to gravel one quarter inch and larger. A second sieve analysis was run using a finer series of screens having an opening size ranging from 0.02 mm to 5 mm. The results are shown in the following Table 7:

TABLE 7

Sieve Analysis

| Compost Particle Size | Percent of Total |
|---|---|
| >5 mm = | 35% |
| 5–2 mm = | 20% |
| 2–0.2 mm = | 35% |
| 0.2–0.02 mm = | 8% |
| <0.02 mm = | 2% |

As shown in Table 7, the leaf compost has a relatively low content of very fine material (>0.2 mm), which also contributes to its permeability.

4. Miscellaneous Tests—Additional tests showed that the leaf compost had an organic content averaging about 27 percent. This is relatively low and is primarily due to the density of the contained gravel. The pH of the compost was determined to be 7.8.

EXAMPLE 2

Prototype Storm Water Treatment System

A test site was chosen for construction of a full-scale prototype storm water treatment system at a location adjacent to a five lane roadway with additional bike lanes and sidewalks. A relatively narrow water quality swale had previously been constructed in the area downstream from the storm outlet on the roadway. This swale was six feet wide and 250 feet long. The prototype compost storm water treatment facility was constructed at the head of this swale. The swale then drains into a wetland mitigation pond, which in turn drains into a creek. The storm drain system which feeds the swale, was constructed to route low flow to the swale through an 18-inch diameter discharge pipe, and bypass large flows directly to the creek with a flow control manhole. A total of 74 acres drains to the site, consisting of 3.9 acres of the five lane arterial roadway, which is piped directly to the storm outlet, and 70 acres of mixed residential which is also intercepted by the storm drain system and routed to the site.

The prototype compost storm water treatment system was designed to be retrofitted into the existing swale having a cross section as shown in FIG. 4. The base of the swale was widened to 10 feet and given a 2:1 side slope. The swale was given a 2 percent slope from influent to effluent end. A polyethylene liner was installed to prevent percolation of storm waters into the ground. A riprap geotextile was installed over this liner to minimize tearing of the polyethylene liner during construction. Two four-inch diameter perforated PVC drainpipes were installed for the full 100-foot length of the compost bed to facilitate drainage and to provide an effluent sampling point. This drainpipe was then covered with a six-inch layer of two-inch drain rock and an additional two inch layer of pea gravel to provide the underdrain. The drain rock layer was then covered with Amoco 4545 non-woven fabric, as shown in FIG. 3, and 18 inches (120 cubic yards) of the leaf compost of Example 1, screened to ⅜ inches, was layered on top.

FIG. 1 provides a view of the site. The site was fed by an 18-inch diameter discharge pipe, leading into a fore-bay area approximately 30 feet long. The storm water treatment apparatus was divided into two compost beds, each 50 feet long (100 feet total) and 16 feet wide at the surface. The cells were subdivided using wooden end walls. The base of end wall 24 (FIG. 1) was entrenched into the ground so that all storm water entering the fore-bay 38 from the discharge pipe flowed over the top of the end wall and then over and through the compost bed. End walls 26 and 27 had a two inch gap at their bases to allow free drainage of treated storm water through the rock under-drain and out the effluent end. The effluent ends of the parallel drain pipes were coupled to provide an effluent sampling point as shown in FIG. 1. Each end wall had a ten foot wide cutout at the top to channel water over the end wall (See FIG. 3). A longitudinal cross section of the treatment facility is shown in FIG. 2.

Two ISCO Model 3700 automatic samplers were installed at the site, one at the influent end and the other at the effluent end of the treatment system. These samplers were housed in Plasti-Fab Model 4A weather-proof fiberglass sampler shelters for protection against the elements and possible vandalism. An ISCO Model 3230 flow meter, using the bubbler method of flow level measurement, was also located at the influent end of the system and connected to both of the samplers. The bubbler tube was placed just inside the 18-inch discharge pipe. The flow meter detected the onset of a storm event, triggering the automatic samplers, and converted the flow depth into a properly scaled flow rate value. The effluent sampler was set with a 10-minute delay to allow for the time required for initial discharge from the compost bed. The influent sample intake was placed in the discharge pipe, just after the bubbler; the effluent sample intake was placed at the discharge end of the 4-inch diameter perforated plastic drain pipe which ran the length of the treatment system.

The samplers were equipped with a storm pacing program. When the flow meter detected a flow depth of 0.2 feet in the discharge pipe, it was set to trigger both samplers to take two time-paced (first flush) samples (with 10-minute delay for effluent sampler). These samples were collected in each of two sample containers at 5 and 10 minute intervals (15 and 20 minutes for the effluent sampler). A one gallon glass container was used for oil and grease analysis and a one gallon polyethylene container was used for the remaining chemistries. The storm program then switched the sampler to flow paced or weighted composite sampling. Each time the flow meter sensed 1,000 gallons, it triggered a flow pulse to the samplers. After 10 consecutive flow pulses, the samplers took a 170 ml sample into each of two additional polyethylene containers. The sampler then sent a pulse back to the flow meter to record exactly when it took the sample. This flow paced sampling mode continued until the flow meter had not sensed flow for a continuous two-hour period, or until 22 flow paced samples were collected, after which it turned the samplers off. The sampling rate of 1 per 10,000 gallons was based on a rainfall of 0.2 inches and the size of the drainage area. It required adjustment for different projected rainfalls and different drainage area sizes. The flow data with the information documenting sample collection times was then downloaded from the flow meter to a portable laptop computer using ISCO Flowlink software.

Influent and effluent samples were collected from the automatic samplers as soon as possible following cessation of a sampled storm event. The samples were then analyzed using the procedures set forth in Table 8.

TABLE 9-continued

| Rainfall Events Tested (24 hour totals) | |
|---|---|
| Event | 24 Hour Total |
| 4 | 1.474 |
| 5 | 0.599 |
| 6 | 0.317 |
| 7 | 0.830 |
| 8 | 0.897 |
| 9 | 1.376 |

For each storm, influent (INF) and effluent (EFF) samples were taken for both the time paced (first flush or FF) and flow paced (FP) part of the event. In some cases, one or the other is missing due to sampling prob-

TABLE 8

| Analysis | Laboratory Analysis Procedures | | | | |
|---|---|---|---|---|---|
| | Units | Reference | Edition | Procedure | Min. Value |
| Turbidity | NTU | EPA | Rev. 83 | 180 | 0.1 |
| Conductivity | UMHO | Std. Methods | 16 | 205 | 1 |
| T-COD (Chemical Oxygen Demand) | mg/l | EPA | Rev. 83 | 410.4 | 2 |
| pH - Lab | pH | EPA | Rev. 83 | 150.1 | 0.1 |
| TS (Total Solids) | mg/l | Std. Methods | 16 | 209A | 2 |
| TDS (Total Dissolved Solids) | mg/l | Std. Methods | 16 | 209C | 2 |
| TSS (Total Suspended Solids) | mg/l | Std. Methods | 16 | 209C | 0.01 |
| TVSS (Total Volatile Suspended Solids) | mg/l | Std. Methods | 16 | 209D | 0.01 |
| Sett. Solids (Settleable Solids) | ml/l | Std. Methods | 16 | 209E | 0.1 |
| NH3-N (Ammonia) | mg/l | Std. Methods | 16 | 417G | 0.01 |
| TKN (Total Kjeldahl (Organic) Nitrogen) | mg/l | EPA | Rev. 83 | 351.2 | 0.2 |
| NO2NO3-N (Nitrite-Nitrate Nitrogen) | mg/l | EPA | Rev. 83 | 353.2 | 0.01 |
| T-PO4-P (Total Phosphorus) | mg/l | EPA | Rev. 83 | 365.4 | 0.02 |
| S-OPO4-P | mg/l | EPA | Rev. 83 | 365.1 | 0.01 |
| T-CA (Calcium) | mg/l | EPA | Rev. 83 | 200.7 | 0.06 |
| T-Mg (Magnesium) | mg/l | EPA | Rev. 83 | 200.7 | 1.06 |
| T-Na (Sodium) | mg/l | EPA | Rev. 83 | 200.7 | 0.05 |
| T-K (Potassium) | mg/l | EPA | Rev. 83 | 200.7 | 1.6 |
| Chloride | mg/l | Std. Methods | 16 | 407-1 | 0.1 |
| T-As (Arsenic) | ug/l | EPA | Rev. 83 | 206.3 | 0.1 |
| T-Ba (Barium) | ug/l | EPA | Rev. 83 | 207.7 | 2 |
| T-Be (Beryllium) | ug/l | EPA | Rev. 83 | 207.7 | 2 |
| T-B (Boron) | ug/l | EPA | Rev. 83 | 207.7 | 36 |
| T-Cd (Cadmium) | ug/l | EPA | Rev. 83 | 207.7 | 14 |
| T-Cr (Chromium) | ug/l | EPA | Rev. 83 | 207.7 | 14 |
| T-Co (Cobalt) | ug/l | EPA | Rev. 83 | 207.7 | 8 |
| T-Cu (Copper) | ug/l | EPA | Rev. 83 | 207.7 | 10 |
| T-Fe (Iron) | ug/l | EPA | Rev. 83 | 207.7 | 10 |
| T-Pb (Lead) | ug/l | EPA | Rev. 83 | 207.7 | 120 |
| T-Mn (Manganese) | ug/l | EPA | Rev. 83 | 207.7 | 2 |
| T-Ni (Nickel) | ug/l | EPA | Rev. 83 | 207.7 | 20 |
| T-Ag (Silver) | ug/l | EPA | Rev. 83 | 207.7 | 30 |
| T-V (Vanadium) | ug/l | EPA | Rev. 83 | 207.7 | 16 |
| T-Zn (Zinc) | ug/l | EPA | Rev. 83 | 207.7 | 4 |
| T-Sb (Antimony) | ug/l | EPA | Rev. 83 | 207.7 | 56 |
| T-Al (Aluminum) | ug/l | EPA | Rev. 83 | 207.7 | 10 |
| T-Se (Selenium) | ug/l | EPA | Rev. 83 | 207.7 | 100 |
| T-Tl (Thallium) | ug/l | EPA | Rev. 83 | 207.7 | 80 |
| T-Hg (Mercury) | ug/l | EPA | Rev. 83 | 245.1 | 0.5 |
| Oil & Grease | mg/l | EPA | Rev. 83 | IR-413.2 | 0.5 |
| Pet. Hydro. (Petroleum Hydrocarbons) | mg/l | EPA | Rev. 83 | IR-418.1 | 0.5 |

The storm event number and rainfall intensities of the individual storm events for which samples were obtained are shown in Table 9.

TABLE 9

| Rainfall Events Tested (24 hour totals) | |
|---|---|
| Event | 24 Hour Total |
| 1 | 0.080 |
| 2 | 0.008 |
| 3 | 0.600 | lems. In the case of three storms, hand grab samples were taken—these are labeled as grabs (G).

The average removal rate for turbidity (TURB), total solids (TS), total dissolved solids (TDS), total suspended solids (TSS), total volatile suspended solids (TVSS), chemical oxygen demand (COD), total phosphorus (T-P), soluble phosphorus (S-P), total Kjeldahl nitrogen (TKN), nitrites-nitrates (NO3) and ammonia nitrogen (NH3) for each tested influent (I) and effluent (E) sample is given in Table 10A or 10B:

TABLE 10A

| | Average Removal Rates (mg/l) | | | | | | | |
|---|---|---|---|---|---|---|---|---|
| Event | TURB-I | TURB-E | TS-I | TS-E | TDS-I | TDS-E | TSS-I | TSS-E | TVSS-I | TVSS-E |
| 1-G | | | 240.0 | 206.0 | 185.0 | 202.0 | 54.6 | 3.7 | | |
| 2-G | | | 146.0 | 260.0 | 107.0 | 247.0 | 38.7 | 12.6 | 1.29 | 1.05 |

TABLE 10A-continued

| | | | Average Removal Rates (mg/l) | | | | | | | |
|---|---|---|---|---|---|---|---|---|---|---|
| Event | TURB-I | TURB-E | TS-I | TS-E | TDS-I | TDS-E | TSS-I | TSS-E | TVSS-I | TVSS-E |
| 3-G | | | 560.0 | 180.0 | 38.0 | 144.0 | 522.0 | 35.0 | 61.50 | 5.87 |
| 3-FP | 120.0 | 20.0 | 546.0 | 192.0 | 95.0 | 163.0 | 451.0 | 28.7 | 48.00 | 6.40 |
| 4-FF | 42.0 | 33.0 | 210.0 | 240.0 | 114.0 | 219.0 | 96.1 | 20.9 | 26.10 | 3.60 |
| 4-FP | 17.0 | 8.0 | 102.0 | 88.0 | 56.0 | 81.0 | 46.4 | 7.0 | 7.20 | 1.76 |
| 5-FF | 8.1 | 5.5 | 120.0 | 168.0 | 63.0 | 144.0 | 56.9 | 24.2 | 8.00 | 20.90 |
| 5-FP | 8.1 | 5.4 | 82.0 | 80.0 | 58.0 | 78.0 | 24.5 | 1.7 | 5.88 | 1.00 |
| 6-FF | 350.0 | 8.0 | 596.0 | 108.0 | 266.0 | 106.0 | 330.0 | 2.3 | 72.30 | 1.14 |
| 7-FF | 300.0 | 36.0 | 1720.0 | 162.0 | 110.0 | 131.0 | 1610.0 | 31.2 | 170.00 | 6.80 |
| 7-FP | 34.0 | 26.0 | 232.0 | 120.0 | 81.0 | 107.0 | 151.0 | 13.0 | 21.50 | 3.52 |
| 8-FP | 18.0 | 11.0 | 136.0 | 120.0 | 98.0 | 116.0 | 38.2 | 4.2 | 9.60 | 1.32 |
| 9-FF | 110.0 | 6.0 | 290.0 | 100.0 | 134.0 | 98.0 | 156.0 | 2.3 | 48.00 | 0.24 |
| Mean | 100.72 | 15.89 | 383.08 | 155.69 | 108.08 | 141.23 | 275.03 | 14.37 | 39.95 | 4.47 |
| Standard Dev. | 125.26 | 11.93 | 440.51 | 58.35 | 61.06 | 53.28 | 434.15 | 12.19 | 47.44 | 5.66 |
| Maximum | 350.00 | 36.00 | 1720.00 | 260.00 | 266.00 | 247.00 | 1610.00 | 35.00 | 170.00 | 20.90 |
| Minimum | 8.10 | 5.40 | 82.00 | 80.00 | 38.00 | 78.00 | 24.50 | 1.72 | 1.29 | 0.24 |
| N | 10 | 10 | 13 | 13 | 13 | 13 | 13 | 13 | 12 | 12 |
| % Removal | | 84.2% | | 59.4% | | +30.7% | | 94.8% | | 88.8% |

TABLE 10B

| | | | | Average Removal Rates (mg/l) | | | | | | | |
|---|---|---|---|---|---|---|---|---|---|---|---|
| Event | COD-I | COD-E | T-P-I | T-P-E | S-P-I | S-P-E | TKN-I | TKN-E | NO3-I | NO3-E | NH3-I | NH3-E |
| 1-G | 175.0 | 55.0 | 1.280 | 0.780 | | | 2.580 | 1.600 | | | | |
| 2-G | 80.4 | 64.0 | 1.480 | 0.517 | 0.096 | 0.644 | 1.800 | 1.840 | 0.558 | 0.715 | 0.273 | 0.093 |
| 3-G | 180.0 | 80.0 | 1.360 | 0.900 | 0.187 | 0.648 | 3.400 | 1.260 | 0.423 | 0.592 | 0.268 | 0.054 |
| 3-FP | 127.0 | 96.5 | 0.945 | 0.920 | 0.216 | 0.627 | 1.400 | 1.160 | 0.703 | 0.711 | 0.258 | 0.049 |
| 4-FF | 105.0 | 68.0 | 0.440 | 0.800 | 0.027 | 0.511 | 1.170 | 1.010 | 0.427 | 1.040 | 0.051 | 0.041 |
| 4-FP | 66.0 | 31.0 | 0.470 | 0.550 | 0.080 | 0.411 | 0.730 | 0.360 | 0.230 | 0.235 | 0.047 | 0.039 |
| 5-FF | 44.0 | 40.0 | 0.330 | 0.510 | 0.088 | 0.425 | 0.520 | 0.044 | 0.102 | 0.326 | 0.097 | 0.049 |
| 5-FP | 32.0 | 26.0 | 0.190 | 0.460 | 0.074 | 0.362 | 0.350 | 0.250 | 0.170 | 0.191 | 0.089 | 0.054 |
| 6-FF | 150.0 | 32.0 | 3.200 | 1.400 | 0.131 | 0.527 | 3.000 | 1.100 | 0.491 | 0.259 | 0.038 | 0.055 |
| 7-FF | 644.0 | 46.0 | 4.400 | 1.000 | 0.132 | 0.454 | 8.720 | 0.800 | 0.059 | 0.143 | 0.048 | 0.031 |
| 7-FP | 54.0 | 29.0 | 1.400 | 1.000 | 0.244 | 0.465 | 0.600 | 1.100 | 0.110 | 0.193 | 0.017 | 0.093 |
| 8-FP | 64.0 | 45.6 | 0.900 | 1.000 | 0.247 | 0.419 | 0.800 | 0.960 | 0.072 | 0.190 | 0.017 | 0.015 |
| 9-FF | 210.0 | 27.0 | 0.640 | 0.306 | 0.090 | 0.321 | 1.400 | 0.200 | 0.245 | 0.223 | 0.018 | 0.140 |
| Mean | 148.57 | 49.24 | 1.31 | 0.78 | 0.13 | 0.48 | 2.04 | 0.90 | 0.30 | 0.40 | 0.10 | 0.06 |
| Standard Dev. | 159.52 | 22.30 | 1.21 | 0.30 | 0.07 | 0.11 | 2.23 | 0.55 | 0.21 | 0.29 | 0.10 | 0.03 |
| Maximum | 644.00 | 96.50 | 4.40 | 1.40 | 0.25 | 0.65 | 8.72 | 1.84 | 0.70 | 1.04 | 0.27 | 0.14 |
| Minimum | 32.00 | 26.00 | 0.19 | 0.31 | 0.03 | 0.32 | 0.35 | 0.04 | 0.06 | 0.14 | 0.02 | 0.02 |
| N | 13 | 13 | 13 | 13 | 12 | 12 | 13 | 13 | 12 | 12 | 12 | 12 |
| % Removal | | 66.9% | | 40.5% | | +260.7% | | 55.9% | | +34.2% | | 41.6% |

In Tables 10A and 10B, data from first flush (FF) and flow paced (FP) samples are weighted or treated equally for statistical purposes. Turbidity (TURB) average 84.2 percent improvement through the test period. Turbidity improvement is important in storm water treatment for aesthetic reasons. Total suspended solid (TSS) removals, the most important of the solids fraction in respect to an indicator of pollution suspended solids (TVSS) removal, which represents the organic fraction of the suspended solids, averaged 88.8 percent. Removal of suspended solids is primarily by direct filtration.

While total solids decreased in the effluent an average of 59.4 percent, total dissolved solids (TDS) showed a 30.7 percent mean increase. Total solids includes total dissolved solids (TDS), that soluble portion consisting primarily ionic species, and total suspended solids (TSS), the larger particles more commonly associated with pollution problems. Because the compost acts as an ion exchanger, lighter soluble elements, such as potassium, calcium and magnesium are released in the exchange process with heavier elements such as nickel and zinc, which are retained in the compost. This loss is reflected in the increased TDS in the effluent, and the relatively low (59.4 percent) TS removal rate.

Chemical Oxygen Demand (COD), a measurement of the oxygen-consuming capacity of inorganic and organic matter, averaged 66.9 percent. This removal efficiency was reduced in part by relatively poor removals in some of the earlier storms due to drain rock and construction contamination.

The first flush portion (first half hour) of a storm event carries a significantly higher pollutant loading than the remaining or flow paced portion. A series of heavy storms during storm events 7, 8 and 9 provided an opportunity to examine this hypothesis, and test the effectiveness of the compost storm water filter under very heavy first flush conditions. As can be seen from Tables 10A and 10B, the first flush portion of these storms contained significantly higher loadings than the flow paced portion. For example, during the first flush period, COD loading averaged 334.7 mg/l, as opposed to 59.0 mg/l during the remainder of the storm. The highest reading for COD occurred during storm event 7, with an effluent strength of 644.0 mg/l and an effluent (treated) level of 46.0. This represents a 92.9 percent removal rate. During the event 7 first flush portion, total suspended solids (TSS) measured 1610.0 mg/l, the effluent 31.2 mg/l, giving a treatment efficiency of 98 percent. Values for other parameters, while not as extreme, also show the excellent shock loading capabilities of the compost storm water treatment system.

Total phosphorus removal rates averaged 40.5 percent during the period. This removal rate is comparable to mean total phosphorus removals in alternative storm water treatment processes such as wet detention ponds and swales. As with the other pollutants, total phosphorus removal was highest during first flush events, when loading rates were greatest. During the storm event 7, when the influent phosphorus loading was the greatest encountered during the test period, total phosphorus removal efficiency achieved 77 percent.

There was an interesting relationship ascertained between total and soluble phosphorus in these tests. Total phosphorus includes particulate (i.e., phosphorus attached to solids) and soluble phosphorus. The influent phosphorus contained a high proportion of particulate phosphorous (9:1—particulate:soluble), while in the effluent from the compost storm water treatment facility, the soluble portion made up the highest proportion (1:9—particulate:soluble). This indicates that the system is pulling out the particulate phosphorous, but the release taking place is primarily in the soluble form. Soluble phosphorus consistently showed a net increase across the compost filter, which may be due to the soluble phosphorus acting in an anion exchange reaction. Organic nitrogen (TKN) showed a mean reduction of 55.9 percent during the test period, while nitrite-nitrate nitrogen increased in the effluent by 34.2 percent. Ammonia, which was probably chemically converted to nitrate in the system gave a mean removal rate of 41.6 percent. Again, ammonia removal efficiencies were best at the highest loading rates.

The average removal rates for metals for all storm events are summarized in Tables 11A and 11B.

TABLE 11A

Average Removal Rates - Metals

| Event | Al-I ug/l | Al-E ug/l | B-I ug/l | B-E ug/l | Ba-I ug/l | Ba-E ug/l | Ca-I mg/l | Ca-E mg/l | Cd-I ug/l | Cd-E ug/l | Co-I ug/l | Co-E ug/l | Cr-I ug/l | Cr-E ug/l | Cu-I ug/l | Cu-E ug/l |
|---|---|---|---|---|---|---|---|---|---|---|---|---|---|---|---|---|
| 1-G | | | | | | | | | 6.00 | 7.20 | | | 6.70 | 3.30 | 46.30 | 17.70 |
| 2-G | 5554.0 | 1408.0 | 64.6 | 130.0 | 84.7 | 74.9 | 24.80 | 48.36 | 8.80 | 5.37 | 5.80 | 4.40 | 6.40 | 4.00 | 31.70 | 18.60 |
| 3-G | 302.5 | 1576.0 | 9.9 | 70.0 | 142.6 | 26.7 | 11.87 | 9.47 | | | 11.31 | 1.00 | 17.58 | 3.90 | 36.71 | 11.90 |
| 3-FP | 10880.0 | 1396.0 | 14.6 | 76.7 | 111.3 | 29.9 | 13.05 | 14.66 | | | 9.80 | 1.35 | 14.59 | 23.69 | 28.56 | 11.20 |
| 4-FF | 3799.0 | 1919.0 | 26.9 | 61.7 | 47.8 | 42.8 | 12.50 | 25.30 | | | 3.00 | 1.10 | 7.00 | 3.10 | 20.60 | 8.10 |
| 4-FP | 1168.0 | 514.0 | 11.8 | 40.2 | 16.1 | 11.7 | 5.50 | 6.53 | | | 0.80 | 0.32 | 2.44 | 6.84 | 6.95 | 6.79 |
| 5-FF | | | | | | | | | | | | | | | | |
| 5-FP | 1465.0 | 383.1 | 12.8 | 36.9 | 21.9 | 19.7 | 6.66 | 14.51 | 0.24 | 0.40 | 1.20 | 0.29 | 3.00 | 1.56 | 10.30 | 6.36 |
| 6-FF | 23100.0 | 501.6 | 22.7 | 40.7 | 219.1 | 15.3 | 29.95 | 12.43 | 0.28 | 1.40 | 12.86 | 0.29 | 17.96 | 1.65 | 35.59 | 6.74 |
| 7-FF | 41080.0 | 2085.0 | 8.7 | 29.0 | 425.9 | 31.5 | 34.80 | 13.70 | 0.18 | 5.71 | 35.16 | 1.45 | 52.08 | 2.99 | 81.18 | 9.30 |
| 7-FP | 4762.0 | 1760.0 | 14.4 | 30.0 | 57.9 | 21.7 | 7.91 | 9.74 | | | 3.98 | 0.85 | 6.98 | 2.75 | 12.80 | 6.81 |
| 8-FP | 3660.0 | 608.6 | 29.0 | 27.1 | 50.8 | 16.0 | 21.34 | 11.96 | 2.63 | 0.02 | 2.69 | 0.42 | 5.25 | 3.94 | 13.64 | 6.08 |
| 9-FF | 756.1 | 327.5 | 16.1 | 12.1 | 100.5 | 24.8 | 18.54 | 13.88 | 3.02 | | 5.78 | 0.20 | 13.24 | 1.66 | 25.96 | 7.22 |
| Mean | 8775.15 | 1134.44 | 21.04 | 50.39 | 116.24 | 28.63 | 16.99 | 16.41 | 3.63 | 3.35 | 8.40 | 1.06 | 12.77 | 4.95 | 29.19 | 9.73 |
| Standard Dev. | 12562.01 | 672.77 | 15.93 | 32.87 | 118.21 | 17.67 | 9.75 | 11.60 | 8.80 | 3.10 | 9.75 | 1.20 | 13.49 | 6.07 | 20.33 | 4.36 |
| Maximum | 41080.00 | 2085.00 | 64.60 | 130.00 | 425.90 | 74.90 | 34.80 | 48.36 | 0.18 | 7.20 | 35.16 | 4.40 | 52.08 | 23.69 | 81.18 | 18.60 |
| Minimum | 302.50 | 327.50 | 8.70 | 12.10 | 16.06 | 11.70 | 5.50 | 6.53 | | 0.02 | 0.80 | 0.20 | 2.44 | 1.56 | 6.95 | 6.08 |
| N | 11 | 11 | 11 | 11 | 11 | 11 | 11 | 11 | 6 | 6 | 11 | 11 | 12 | 12 | 12 | 12 |
| % Removal | 87.1% | | +139.5% | | 75.4% | | 3.4% | | +10.9% | | 87.4% | | 61.2% | | 66.7% | |

TABLE 11B

| | | | | | | Average Removal Rates - Metals | | | | | | | | | |
|---|---|---|---|---|---|---|---|---|---|---|---|---|---|---|---|
| Event | Fe-I ug/l | Fe-E ug/l | K-I mg/l | K-E mg/l | Mg-I mg/l | Mg-E mg/l | Mn-I ug/l | Mn-E ug/l | Na-I mg/l | Na-E mg/l | Ni-I ug/l | Ni-E ug/l | V-I ug/l | V-E ug/l | Zn-I ug/l | Zn-E ug/l |
| 1-G | | | | | | | | | | | | | | | 150.00 | 32.90 |
| 2-G | 5465.0 | 1233.0 | 3.74 | 13.29 | 2.84 | 12.14 | 152.70 | 64.00 | 11.35 | 11.69 | 15.20 | 13.20 | 26.10 | 12.60 | 133.50 | 22.00 |
| 3-G | 25840.0 | 1928.0 | 3.52 | 9.95 | 3.54 | 2.65 | 39.26 | 61.01 | 2.91 | 3.64 | 4.34 | 3.00 | 9.80 | 16.74 | 15.76 | 21.40 |
| 3-FP | 16750.0 | 1914.0 | 3.12 | 10.47 | 3.81 | 3.76 | 364.10 | 51.01 | 3.86 | 5.11 | 12.00 | 17.28 | 45.15 | 15.98 | 318.10 | 23.56 |
| 4-FF | 5636.0 | 2444.0 | 1.79 | 7.74 | 1.46 | 6.03 | 105.50 | 52.30 | 3.75 | 5.00 | 5.10 | 3.20 | 16.10 | 11.10 | 144.90 | 27.40 |
| 4-FP | 1795.0 | 722.2 | 1.33 | 4.75 | 0.93 | 1.65 | 36.29 | 15.90 | -1.85 | 2.06 | 3.18 | 6.10 | 6.69 | 13.68 | 52.82 | 12.71 |
| 5-FF | | | | | | | | | | | | | | | | |
| 5-FP | 2029.0 | 544.1 | 1.39 | 4.94 | 1.05 | 3.64 | 53.72 | 19.83 | 2.46 | 2.52 | 2.69 | 2.00 | 7.08 | 8.11 | 180.00 | 13.54 |
| 6-FF | 13860.0 | 608.1 | 4.58 | 2.89 | 5.93 | 2.58 | 601.90 | 9.12 | 8.54 | 3.32 | 19.61 | 4.36 | 13.42 | 8.18 | 274.40 | 21.89 |
| 7-FF | 53140.0 | 2730.0 | 4.47 | 3.39 | 7.53 | 3.18 | 1264.00 | 58.04 | 4.13 | 3.24 | 33.94 | 8.22 | 177.00 | 12.50 | 556.40 | 37.54 |
| 7-FP | 6331.00 | 1926.0 | 1.91 | 3.36 | 1.64 | 2.34 | 154.80 | 33.88 | 2.35 | 2.49 | 4.64 | 2.89 | 19.00 | 10.50 | 109.30 | 20.52 |
| 8-FP | 4801.0 | 780.9 | 2.17 | 2.33 | 3.33 | 2.45 | 104.00 | 13.92 | 5.92 | 2.57 | 4.58 | 1.89 | 14.71 | 6.78 | 99.58 | 13.59 |
| 9-FP | 10940.0 | 1330.0 | 2.01 | 2.28 | 2.37 | 2.74 | 226.50 | 11.90 | 4.02 | 3.74 | 11.95 | 1.90 | 27.98 | 4.99 | 230.00 | 17.46 |
| Mean | 13326.09 | 1469.12 | 2.73 | 5.95 | 3.13 | 3.92 | 282.07 | 35.54 | 4.65 | 4.13 | 10.66 | 5.82 | 33.00 | 11.01 | 188.73 | 22.04 |
| Standard Dev. | 15041.87 | 765.58 | 1.20 | 3.81 | 2.07 | 2.95 | 366.55 | 22.01 | 2.91 | 2.70 | 9.54 | 5.12 | 49.05 | 3.75 | 144.65 | 7.65 |
| Maximum | 53140.00 | 2730.00 | 4.58 | 13.29 | 7.53 | 12.14 | 1264.00 | 64.00 | 11.35 | 11.69 | 33.94 | 17.28 | 177.00 | 16.74 | 556.40 | 37.54 |
| Minimum | 1795.00 | 544.10 | 1.33 | 2.28 | 0.93 | 1.65 | 36.29 | 9.12 | 1.85 | 2.06 | 2.69 | 1.89 | 6.69 | 4.99 | 15.76 | 12.71 |
| N | 11 | 11 | 11 | 11 | 11 | 11 | 11 | 11 | 11 | 11 | 11 | 11 | 11 | 11 | 12 | 12 |
| % Removal | 89.0% | | +117.8% | | +25.4% | | 87.4% | | 11.2% | | 45.4% | | 66.6% | | 88.3% | |

As shown in Tables 11A and 11B, four cations usually had increased values in the effluent. These were potassium, magnesium, calcium, and, to a lesser extent, sodium. These are the sacrificial cations involved in the cation exchange binding of the heavy metals. Boron was also seen to increase consistently in the effluent from the filter. Boron is an anion, and may have been acting as the sacrificial species for other anions. Cadmium and lead were found either in very low and variable concentrations in the influent storm waters or were not detected. Mean removal rates for aluminum was 87 percent, and 89 percent for iron.

A comparison of removal rates in the first flush and flow paced periods for the heavy storm events 7, 8 and 9 shows the same relationship of highest pollutant loadings and greatest removal efficiency during the first half hour of the storm event, as was seen previously for solids and nutrients. As with the solids and nutrients, the compost storm water treatment system has shown excellent shock loading capabilities for metals as well.

It proved impossible to obtain reliable quantitative information on oil and grease due to the configuration of the sampler intakes. The discharge pipe provided sufficient laminar flow and insufficient mixing which permitted these pollutants to rise to the surface where they could not be sampled. However, visual observations during and immediately following storm events showed a distinct scum of oil and grease on the surface of the fore bay, particularly after heavy storms, while there was no evidence of sheen in the effluent waters. Theoretically, the compost medium should prove highly effective at adsorbing oil and grease residues. Once captured, these materials should be metabolized by microorganisms in the compost, leaving little or no oil and grease accumulation.

Samples were also tested for petroleum hydrocarbons which, because of their lower molecular weights, would mix better with the influent storm water. These data are shown in Table 12, indicating a 86.7 percent mean removal rate. The effluent measurements for petroleum hydrocarbons were, except in one case, below detection limits. Data for settleable solids are also shown in Table 12. Settleable solids removal averaged 95.5 percent during the test period.

TABLE 12

|  | Concentration (mg/l) | | Removal % |
| --- | --- | --- | --- |
|  | Influent | Effluent |  |
| Petroleum hydrocarbons | 4.0 | 0.5 | 86.7 |
| Settleable Solids | 2.4 | 0.1 | 95.5 |

Although not sampled quantitatively, visual observation showed large quantities of floatables entering with the influent storm water. Items included oil and other plastic containers, cigarette filters, leaves, wood debris and miscellaneous plastics. Normally many of these items would float over the surface of a treatment pond and into the receiving water. If the compost treatment facility is properly designed hydraulically (i.e. storm water does not spill over the final wood barrier), all of these items will be captured on the surface of the compost bed.

After the storm events described above, core samples of compost from the treatment facility were obtained and analyzed for comparison to samples of fresh leaf compost. Cation exchange capacities (CEC) dropped in all cells in the treatment facility, but were still high enough to indicate further useful treatment capability. Nutrients were lower in the compost used in the treatment facility, indicative either of microbial activity or low level leaching over time. Cations lost in the ion exchange process (primarily $Ca^{++}$, $Mg^{++}$, and $K^+$) also showed decreases, as would be expected, as did the anion boron. Many of the other metals, particularly iron and aluminum, which would be expected to show increased values, did not do so. The exception was zinc. The percentage of fixed solids in the core samples showed a significant increase, probably due to the capture of inorganic material during storm events. The volatile solids showed a corresponding decrease.

The compost storm water system described operated very effectively. Solids and heavy metal removal rates were particularly impressive. The mean removal of total phosphorus was 40.5 percent, equal to the mean removal rates determined for well designed wet detention ponds and only slightly lower than the 45 percent mean total phosphorus removal to be anticipated from a constructed wetland in this locality. The system also showed itself capable of very good shock loading treatment, with the highest removal efficiencies recorded during heavily polluted first flush storm events. During these shock loadings, even total phosphorus removal achieved a satisfactory 78 percent.

Another advantage of the compost storm water apparatus is that, properly designed hydraulically, all influent storm waters must flow through the compost bed and undergo treatment. There is a tendency in swales, wetlands and ponds, for heavy influent flows from intense storm events to flow over the surface, thus short-circuiting the treatment process. Often in these situations, such as may occur in a severe summer storm, these waters are heavily laden with pollutants. This short-circuiting cannot occur in an adequately designed compost treatment system, as described herein.

A highly significant benefit derived from the use of the compost storm water treatment systems of the present invention, in addition to its excellent removal of solids and metals, is the small footprint occupied compared to conventional storm water treatment processes. The storm water treatment system described above was designed to treat storm water runoff from a tributary area of 74 acres. According to the design approach used, this required 1340 ft$^2$ of compost bed. Due to site restrictions, the facility was downsized about 10 percent to 1200 ft$^2$. According to local design practice, a wet detention pond, three feet deep, sized to achieve 90 percent sediment removal and 40 percent nutrient removal, would require 1.5 acres or 65,250 ft$^2$ to treat storm water runoff from the same 74 acre tributary area. This does not include additional area required for active storage during a storm event. Thus, the compost storm water treatment system requires less than about 5 percent of the land area required for a properly designed wet detention pond and less than about 20 percent of the land area required for a properly designed swale. This can equate to a significant savings in land acquisition costs in an urban or suburban location. In addition, there are added savings in perimeter fencing, landscaping and landscape maintenance costs.

A further benefit of the present invention is that the system is most efficient at high pollutant loadings. Thus, in addition to highways and parking lots, the system should find application in more heavily polluted areas such as light and heavy industrial sites, commercial areas, solid waste transfer stations, airport maintenance and fueling areas, and truck and shipping terminals where heavy metals and oil and greases on paved surfaces are a particular problem. The system is useful to protect wetlands from sediment, heavy metal and organic toxin buildup. The wetland can then be used as a polishing step, in which capacity they are very effective. The system can also be used to retrofit existing detention ponds and swales, particularly those which are undersized in regard to meeting current treatment requirements.

The compost storm water treatment system of the invention has the further advantage of using a recycled material (composted leaves) as the primary treatment medium. After exhaustion of the compost in the storm water filter, the material can be recycled again, either for use as a landfill daily cover to adsorb volatile organic compounds (VOC's) or, in instances where heavy metal loading were minimal, for landscaping use and erosion control.

Still another advantage of the compost storm water treatment system of the invention is that compost contaminated by spills of oil, fuel or other contaminants can be readily removed and replaced, thereby containing the contaminants.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of treating storm water runoff to reduce the amount of pollutants in the runoff prior to discharge into the environment, comprising passing the runoff through a bed of mature deciduous leaf compost at a flow rate of at least about 0.5 gallons/minute/square foot of compost bed surface area.

2. The method of claim 1 wherein the leaf compost comprises at least about 5 percent by dry weight of a permeability enhancing agent.

3. The method of claim 2 wherein the leaf compost comprises at least about 15 percent by dry weight of gravel.

4. The method of claim 1 wherein the leaf compost comprises less than about 15 percent by dry weight of non-leaf origin organic matter.

5. The method of claim 4 wherein the leaf compost comprises less than about 5 percent by dry weight of non-leaf origin organic matter.

6. The method of claim 1 wherein the leaf compost is contained in at least one chamber for containing compost defined by a pair of opposed side walls and a pair of opposed end walls, the treated runoff is received by a drain field positioned beneath the compost chamber, and a layer of water permeable material is interposed between the compost chamber and the drain field, the layer of water permeable material providing fluid communication between the compost chamber and the drain field while preventing the flow of the compost into the drain field.

7. An apparatus for treating storm water runoff comprising:
 (a) at least one chamber for containing compost defined by a pair of opposed side walls and a pair of opposed end walls;
 (b) storm water influent means for providing storm water to the compost chamber;
 (c) a drain field positioned beneath the compost chamber for receiving storm water from the compost chamber;
 (d) a layer of water permeable material interposed between the compost chamber and the drain field, the layer of water permeable material providing fluid communication between the compost chamber and the drain field while preventing the flow of compost material into the drain field, the layer of permeable material comprising a nonwoven construction fabric having a permeability of at least about 0.1 cm/sec, a permittivity of at least about 50 gal/min/ft$^2$ and an apparent opening size of at least about US sieve number 60; and
 (e) storm water effluent means in fluid communication with the drain field for discharging treated storm water from the apparatus.

8. The apparatus of claim 7 which further comprises means for distributing storm water in the compost chamber.

9. The apparatus of claim 8 wherein the means for distributing the storm water comprises a distributor box having a peripheral flange adapted for mounting the distributor box to an upper portion of one of the end walls of the compost chamber and a bottom wall, a plurality of orifices in the bottom wall of the distributor box, and a plurality of flanged inflow pipes mounted on the bottom wall of the distributor box in fluid communication with the orifices, the flanged inflow pipes having a sufficient length to prevent floatable materials from overflowing the end wall of the apparatus.

* * * * *

UNITED STATES PATENT AND TRADEMARK OFFICE
CERTIFICATE OF CORRECTION

PATENT NO. : 5,322,629   Page 1 of 2
DATED : June 21, 1994
INVENTOR(S) : W.C. Stewart It is certified that error appears in the above-indentified patent and that said Letters Patent is hereby corrected as shown below:

COLUMN

| | | |
|---|---|---|
| [56] (Pg. 1) | Refs. Cited (Publ. 5) | "Technologyb" s/r --Technology-- |
| [56] (Pg. 1) | Refs. Cited (Publ. 5) | "manage." s/r --Manage.-- |
| [56] (Pg. 1) | Refs. Cited (Publ. 9) | "Wis.," s/r --WI,-- |
| [56] (Pg. 1) | Refs. Cited (Publ. 10) | "38" s/r --37-- |
| [56] (Pg. 1) | Refs. Cited (Publ. 11) | "contaminated" s/r --Contaminated-- |
| 1 | 52 | "1990;" s/r --1990b-- |
| 8 | 65 | "Zucconi, F. et a.," s/r --Zucconi, F. et al.,-- |
| 9 | 35 | "though" s/r --thought-- |
| 9 | 38 | "1987)." s/r --1982; Tate, R.L., "Soil Organic Matter," John Wiley & Sons, New York, NY, 1987).-- |
| 14 | 7 | "De Bertoldi e Production," s/r --De Bertoldi et al. Ed., Compost: Production,-- |

UNITED STATES PATENT AND TRADEMARK OFFICE
CERTIFICATE OF CORRECTION

PATENT NO. : 5,322,629
DATED : June 21, 1994
INVENTOR(S) : W.C Stewart

It is certified that error appears in the above-indentified patent and that said Letters Patent is hereby corrected as shown below:

Column 23, line 56, "primarily ionic" s/r —primarily of ionic—

Signed and Sealed this

Fourth Day of October, 1994

Attest:

BRUCE LEHMAN

Attesting Officer

Commissioner of Patents and Trademarks